(12) United States Patent (10) Patent No.: US 8,157,042 B2
Fujiki (45) Date of Patent: Apr. 17, 2012

(54) WORKING VEHICLE WITH CABIN

(75) Inventor: Katsumi Fujiki, Osaka (JP)

(73) Assignee: Yanmar Co., Ltd, Osaka (JP)

( * ) Notice: Subject to any disclaimer, the term of this patent is extended or adjusted under 35 U.S.C. 154(b) by 206 days.

(21) Appl. No.: 12/310,379

(22) PCT Filed: Jan. 15, 2007

(86) PCT No.: PCT/JP2007/050400
§ 371 (c)(1),
(2), (4) Date: Mar. 16, 2009

(87) PCT Pub. No.: WO2008/050489
PCT Pub. Date: May 2, 2008

(65) Prior Publication Data
US 2009/0242302 A1 Oct. 1, 2009

(30) Foreign Application Priority Data
Oct. 25, 2006 (JP) .................................. 2006-289748

(51) Int. Cl.
*D62D 33/06* (2006.01)
(52) U.S. Cl. ................ 180/89.12; 180/312; 296/190.01; 296/190.04
(58) Field of Classification Search .................. 180/89.1, 180/89.11, 89.12, 312; 296/190.01, 190.04
See application file for complete search history.

(56) References Cited

U.S. PATENT DOCUMENTS

| | | | | |
|---|---|---|---|---|
| 6,056,502 A * | 5/2000 | Takemura et al. | | 414/686 |
| 6,145,613 A | 11/2000 | Thompson et al. | | |
| 6,237,957 B1 * | 5/2001 | Takekata et al. | | 280/781 |
| 6,729,431 B2 * | 5/2004 | Osuga et al. | | 180/312 |
| 6,752,228 B2 * | 6/2004 | Aoyama et al. | | 180/89.12 |
| 6,758,301 B2 * | 7/2004 | Shiba et al. | | 180/383 |
| 6,935,457 B2 * | 8/2005 | Tsuda | | 180/312 |
| 7,757,805 B2 * | 7/2010 | Wakuta et al. | | 180/312 |
| 7,832,519 B2 * | 11/2010 | Sakamoto et al. | | 180/312 |
| 2002/0011375 A1 * | 1/2002 | Ishimori et al. | | 180/298 |
| 2002/0104699 A1 | 8/2002 | Dambuis | | |
| 2003/0015363 A1 * | 1/2003 | Aoyama et al. | | 180/89.12 |
| 2003/0136602 A1 * | 7/2003 | Tsuda | | 180/312 |
| 2004/0118627 A1 * | 6/2004 | Ohtsuki et al. | | 180/312 |

FOREIGN PATENT DOCUMENTS

| | | |
|---|---|---|
| DE | 10 2004 030704 | 1/2006 |
| EP | 0 355 345 | 2/1990 |

(Continued)

*Primary Examiner* — Toan To
(74) *Attorney, Agent, or Firm* — Jordan and Hamburg LLP

(57) ABSTRACT

A working vehicle with a cabin in which, to lift a cabin upward, a lift arm of a hydraulic lifting mechanism can be easily connected to a cabin. The working vehicle has a travel body having an engine mounted on it, the cabin having an operation seat for an operator, a steering wheel, etc., a link mechanism for connecting a working section to the travel body, the hydraulic lifting mechanism for lifting the working section connected to the link mechanism off the ground, and a lifting rod for detachably connecting the lifting arm of the hydraulic lifting mechanism and the link mechanism. A cabin support body is placed at the lower end of the front of the cabin. The hydraulic lifting mechanism is placed below the rear of the cabin. The upper face side of the hydraulic lifting mechanism is opened by rotating the cabin about the cabin support body. The working vehicle has a projection body engaging the cabin from below, and the projection body is detachably connected to the lifting arm.

13 Claims, 21 Drawing Sheets

FOREIGN PATENT DOCUMENTS

| | | |
|---|---|---|
| EP | 0 955 230 | 11/1999 |
| EP | 1 582 443 | 10/2005 |
| JP | 58-167260 | 10/1983 |
| JP | 60-50079 | 3/1985 |
| JP | 9-109938 | 4/1997 |
| JP | 10-297547 | 11/1998 |
| JP | 10-305785 | 11/1998 |
| JP | 2003-237634 | 8/2003 |
| WO | WO-98/03389 | 1/1998 |
| WO | WO-01/25074 | 4/2001 |

* cited by examiner

WORKING VEHICLE WITH CABIN

TECHNICAL FIELD

The present invention relates to a working vehicle with cabin in which a cabin is mounted, such as a tractor used for a farm work, a wheel loader used for a civil engineering work or the like, and more particularly to a working vehicle with cabin which movably supports the cabin having a control seat for an operator, a control handle, a brake pedal and the like.

BACKGROUND ART

In the recent working vehicle with cabin such as the tractor, the wheel loader or the like, in order to streamline a maintenance work of a hydraulic lifting mechanism arranged below the cabin, for example, there is disclosed a structure which can leave open an upper surface side of the hydraulic lifting mechanism arranged below a rear portion of the cabin by arranging a cabin support body in a front portion of the cabin, and rotating forward the cabin around the cabin support body (refer to patent document 1). It is also known that the cabin is supported at a position which is away from a traveling machine body, via a stand (refer to patent document 2).

Further, in order to streamline a maintenance work of an upper surface side of a traveling machine body such as a transmission case or the like, for example, there is disclosed a structure which can leave open an upper surface side of the hydraulic lifting mechanism, the transmission case and the like arranged below the rear portion of the cabin, by arranging the cabin support body in the front portion or the rear portion of the cabin and rotating forward or rearward the cabin around the cabin support body (refer to patent document 3 or patent document 4).

Further, in order to streamline a maintenance work of an engine arranged in the front portion of the traveling machine body, an upper surface side of the engine is left open by arranging an opening and closing supporting point shaft in a rear portion of a hood for covering the engine, rotating the hood around the opening and closing supporting point shaft, and lifting upward a front portion of the hood (refer to patent document 5).

Patent Document 1: Japanese Unexamined Patent Publication No. 60-50079
Patent Document 2: Japanese Unexamined Patent Publication No. 9-109938
Patent Document 3: Japanese Unexamined Patent Publication No. 10-297547
Patent Document 4: Japanese Unexamined Patent Publication No. 10-305785
Patent Document 5: Japanese Unexamined Patent Publication No. 2003237634

DISCLOSURE OF THE INVENTION

Problem to be Solved by the Invention

In this case, in the working vehicle such as the tractor or the like, the hydraulic lifting mechanism is arranged in an upper surface side of the transmission case. Accordingly, it is possible to simply lift upward the cabin by utilizing the hydraulic lifting mechanism, like the patent document 1. However, in the patent document 1, the cabin needs to be coupled to a lift rod for detachably coupling a lift arm of the hydraulic lifting mechanism and a link mechanism for moving up and down the working machine. In other words, since the coupling structure between the link mechanism and the lift rod, and the coupling structure between the lift rod and the cabin are restricted to each other by the structure of the cabin or the link mechanism, it is impossible to simply construct the structure of the lift rod, the structure of the cabin, or a structure for reattaching the lift rod to the link mechanism and the cabin. Accordingly, a problem is that a work for reattaching the lift rod to the link mechanism and the cabin becomes complicated. Further, in the structure in which the cabin is lifted upward in a state in which a rear end side of a safety frame is coupled to a rear axle case of the transmission case, like the patent document 1, and the structure in which the cabin is lifted upward by providing a handspike and a support bracket in the rear axle case of the transmission case, like the patent document 2, a problem is that it is impossible to simply detach the transmission case or the like.

Further, in the working vehicle such as the tractor or the like, the engine, the hood and the like are arranged in a forward side of the cabin, and a control column having a brake pedal, a control handle and the like is arranged in a rearward side of the engine, the hood and the like. Accordingly, in the case that the control column is arranged in the traveling machine body, like the patent document 3 or the patent document 4, there is a problem that it is impossible to simply construct windbreak and waterproof structures for filling a gap between the control column and the cabin although it is possible to simply construct the structure of the cabin. Accordingly, in the case that the control column is arranged within the cabin, a problem is that it is impossible to simply couple the brake pedal to a brake body of a traveling portion although it is possible to simply construct the windbreak and waterproof structures of the cabin. Another problem is that it is impossible to simply couple the control handle to a steering mechanism of a front wheel.

Further, in the working vehicle such as the tractor or the like, a rear portion of the hood is arranged close to the front face of the cabin. Accordingly, it is possible to widely leave open the front portion and the upper face side of the engine by rotating the hood around the opening and closing supporting point shaft in the rear portion of the hood, whereby it is possible to simply secure a maintenance work space of the engine, like the patent document 5. However, in the structure in which the cabin is rotated forward, like the patent document 1, it is impossible to simply construct the cabin or the hood. For example, it is necessary to construct the cabin or the hood so as to make the cabin rotatable forward in such a manner as to prevent the cabin from being interfered with the hood, or construct the cabin so as to rotate forward after detaching the hood. In other words, since the forward rotation of the cabin is restricted by the hood and the opening and closing supporting point shaft, a problem is that it is impossible to simply lift upward the rear portion of the cabin. In this case, in the structure in which the opening and closing supporting point shaft is arranged in the front side of the hood, and the rear portion of the hood is lifted upward, the cabin is not interfered with the cabin even if the cabin is rotated forward, however, a problem is that the maintenance work space formed between the rear portion of the hood and the front portion of the cabin becomes narrow.

An object of the present invention is to provide a working vehicle with cabin which can simply couple a lift arm of a hydraulic lifting mechanism to the cabin in the case of moving upward the cabin, the working vehicle with cabin which can simply couple a brake pedal to a brake body of a traveling portion while it can simply construct windbreak and waterproof structure of the cabin, and the working vehicle with cabin which can widely leave open a front side and an upper face side of an engine by rotating the hood around an opening and closing supporting point shaft in a rear portion of the hood.

Means for Solving the Problem

In order to achieve the object mentioned above, in accordance with a first aspect of the present invention, in a working vehicle with cabin provided with a traveling machine body mounting an engine thereon, a cabin having a control seat for an operator and a control handle, a link mechanism coupling a working portion to the traveling machine body, a hydraulic lifting mechanism moving aboveground the working portion coupled to the link mechanism, a lift rod detachably coupling a lift arm of the hydraulic lifting mechanism and the link mechanism, and constructed such that an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body, an upthrow body brought into contact with the cabin from the below is provided, and the upthrow body is detachably coupled to the lift arm.

In accordance with a second aspect of the present invention, in the working vehicle with cabin as recited in the first aspect, an upthrow body brought into contact with the cabin from the below is provided, and the upthrow body is detachably coupled to the lift arm from which the lift rod is detached.

In accordance with a third aspect of the present invention, in the working vehicle with cabin as recited in the first or second aspect, a brake operating mechanism coupling a brake pedal to a brake body of the traveling portion, and the cabin support body are arranged on a brake operating shaft provided in the traveling machine body.

In accordance with a fourth aspect of the present invention, in the working vehicle with cabin as recited in the first aspect, a contact body is protruded from a lower face of a cabin bottom plate arranged in a bottom portion of the cabin toward a downward side, and a leading end side of the upthrow body coupled to the lift arm under a downward moving attitude comes into contact with the contact body so as to freely come close thereto and away therefrom.

In accordance with a fifth aspect of the present invention, in the working vehicle with cabin as recited in the first aspect, a cabin frame of the cabin is extended from the cabin support body toward an upward side of a rear axle case of the traveling machine body, a stand fixing device is arranged in the cabin frame between the cabin support body and the rear axle case, and a cabin support stand is detachably coupled to the cabin frame in a forward side of the rear axle case via the stand fixing device.

In accordance with a sixth aspect of the present invention, in the working vehicle with cabin as recited in any one of the first to fifth aspects, the structure is made such that a hood covering the engine is provided, a rear portion of the hood is coupled to the traveling machine body via an opening and closing supporting point shaft, and the hood is rotated around the opening and closing supporting point shaft, whereby a front portion of the hood is movable upward, and the structure is also made such that a cabin support body is arranged in a lower end side of a front portion of the cabin, and the cabin is rotated around the cabin support body, whereby a rear portion of the cabin is movable upward, and the opening and closing supporting point shaft is arranged in the traveling machine body so as to be movable in a longitudinal direction, and a rear end of the hood is movable forward and away from a front face of the cabin by moving the opening and closing supporting point shaft forward.

In accordance with a seventh aspect of the present invention, in the working vehicle with cabin as recited in the sixth aspect, the working vehicle is provided with an engine support frame supporting a rear portion of the engine on the traveling machine body, a hood support body coupling to the engine support frame so as to be rotatable in a longitudinal direction, and a lock mechanism supporting the hood support body at an initial position, and the hood support body is supported at the initial position via the lock mechanism on the basis of an operation returning the hood to the initial position.

In accordance with an eighth aspect of the present invention, in the working vehicle with cabin as recited in the sixth aspect, a front grill covering a forward side of the engine is arranged in a front portion of the hood, and a return spring elastically pressing the hood support body in a direction of returning to the initial position is provided.

In accordance with a ninth aspect of the present invention, in the working vehicle with cabin as recited in the third aspect, a steering hydraulic mechanism is arranged in the traveling machine body, a universal joint coupling a handle shaft of the control handle is provided to an operating shaft of the steering hydraulic mechanism, and the universal joint is arranged on a shaft center line of the brake operating shaft.

EFFECT OF THE INVENTION

In accordance with the first aspect of the present invention, in the working vehicle with cabin provided with the traveling machine body mounting the engine thereon, the cabin having the control seat for the operator and a control handle, the link mechanism coupling the working portion to the traveling machine body, the hydraulic lifting mechanism moving aboveground the working portion coupled to the link mechanism, and the lift rod detachably coupling the lift arm of the hydraulic lifting mechanism and the link mechanism, and constructed such that the upper face side of the hydraulic lifting mechanism is left open by arranging the cabin support body in the lower end portion in the front portion of the cabin, arranging the hydraulic lifting mechanism below the rear portion of the cabin, and rotating the cabin around the cabin support body, since the upthrow body brought into contact with the cabin from the below is provided, and the upthrow body is detachably coupled to the lift arm, it is possible to couple the upthrow body to the cabin on the basis of a simple operation bringing the upthrow body coupled to the lift arm into contact with the bottom portion of the cabin mounted to the traveling machine body. In other words, since the structure of the upthrow body is not restricted by the structure of the link mechanism or the like, it is possible to construct the structure of the cabin or the structure of the upthrow body simple. Accordingly, it is possible to simply couple the lift arm to the cabin via the upthrow body in the case of lifting upward the cabin.

In accordance with the second aspect of the present invention, since the upthrow body brought into contact with the cabin from the below is provided, and the upthrow body is detachably coupled to the lift arm from which the lift rod is detached, it is possible to rotate the cabin around the cabin support body serving as a supporting point by utilizing a hydraulic force of the hydraulic lifting mechanism. Accordingly, it is possible to simply execute a disassembling work or a maintenance work of the transmission case, the hydraulic lifting mechanism and the like in the rear portion of the traveling machine body, by supporting the cabin by utilizing a support means such as a stand or the like in a state in which the rear portion of the cabin is rotated upward.

In accordance with the third aspect of the present invention, since the brake operating mechanism coupling the brake pedal to the brake body of the traveling portion, and the cabin support body are arranged on the brake operating shaft provided in the traveling machine body, the cabin and the brake pedal are rotated around the brake operating shaft (the same shaft center line). Accordingly, it is possible to rotate the cabin around the cabin support body serving as a supporting point without disassembling the brake operating mechanism or the like. It is possible to couple the brake pedal to the brake body of the traveling portion via the brake operating mechanism having the simple structure. Further, it is possible to simply construct the windbreak and waterproof structures of the cabin by arranging the brake pedal within the cabin.

In accordance with the fourth aspect of the present invention, since the contact body is protruded from the lower face of the cabin bottom plate arranged in the bottom portion of the cabin toward the downward side, and the leading end side of the upthrow body coupled to the lift arm under the downward moving attitude comes into contact with the contact body so as to freely come close thereto and away therefrom, it is possible to simply couple the upthrow body to the cabin bottom plate reinforced by the contact body in accordance with an operation bringing the upthrow body into contact with the cabin bottom plate via the contact body. Further, since the upthrow body can be extended in a tangential direction of a rotating locus of the contact body around the cabin support body in the case of lifting upward the cabin, it is possible to support the cabin by the upthrow body having the simple structure.

In accordance with the fifth aspect of the present invention, since the cabin frame of the cabin is extended from the cabin support body toward the upward side of the rear axle case of the traveling machine body, the stand fixing device is arranged in the cabin frame between the cabin support body and the rear axle case, and the cabin support stand is detachably coupled to the cabin frame in the forward side of the rear axle case via the stand fixing device, it is possible to widely leave open the upper face side of the rear portion of the traveling machine body by raising the cabin support stand on the ground, and supporting the cabin lifted above the traveling machine body by the cabin support stand. Accordingly, it is possible to simply take out the rear half portion of the traveling machine body such as the hydraulic lifting mechanism, the transmission case or the like, to the rear side of the traveling machine body. In other words, it is possible to simply execute the maintenance work, the disassembling and assembling work or the like of the rear half portion of the traveling machine body without detaching the cabin from the traveling machine body.

In accordance with the sixth aspect of the present invention, the structure is made such that the hood covering the engine is provided, the rear portion of the hood is coupled to the traveling machine body via the opening and closing supporting point shaft, and the hood is rotated around the opening and closing supporting point shaft, whereby the front portion of the hood is movable upward, and the structure is also made such that the cabin support body is arranged in the lower end side of the front portion of the cabin, and the cabin is rotated around the cabin support body, whereby the rear portion of the cabin is movable upward, and since the opening and closing supporting point shaft is arranged in the traveling machine body so as to be movable in the longitudinal direction, and the rear end of the hood is movable forward and away from the front face of the cabin by moving the opening and closing supporting point shaft forward, it is possible to widely leave open the front side and the upper face side of the engine by rotating the hood around the opening and closing supporting point shaft in the rear portion of the hood. Further, by moving the hood forward, it is possible to prevent the cabin from being interfered with the hood even when the cabin is rotated forward, whereby it is possible to simply lift upward the rear portion of the cabin. In other words, it is possible to widely leave open the front portion of the upper face side of the engine by rotating the hood around the opening and closing supporting point shaft in the rear portion of the hood, whereby it is possible to simply secure the maintenance work space of the engine. Further, it is possible to widely leave open the upper face side of the hydraulic lifting mechanism, the transmission case and the like arranged below the rear portion of the cabin, by rotating forward the cabin around the cabin support body, whereby it is possible to simply secure the maintenance work space of the hydraulic lifting mechanism, the transmission case and the like. Accordingly, it is possible to simply improve the maintenance workability of the engine, the hydraulic lifting mechanism or the like.

In accordance with the seventh aspect of the present invention, since the working vehicle is provided with the engine support frame supporting the rear portion of the engine on the traveling machine body, the hood support body coupling to the engine support frame so as to be rotatable in the longitudinal direction, and the lock mechanism supporting the hood support body at the initial position, and the hood support body is supported at the initial position via the lock mechanism on the basis of the operation returning the hood to the initial position, it is possible to support the opening and closing supporting point shaft which is movable in the longitudinal direction, with a high rigidity via the hood support body having the simple structure. Further, in the case of moving the hood to the closed position for covering the engine, the hood support body is locked at the initial position by the lock mechanism without any special operation of the lock mechanism by the operator. In other words, in the case that the hood support body is returned to the initial position in accordance with the operation returning the forward moved hood rearward, the hood support body is locked to the initial position by the lock mechanism in conjunction with the return. Accordingly, it is possible to prevent the hood from being closed in a state in which the operator neglects the lock operation of the hood support body. Therefore, it is possible to improve an opening and closing operability of the hood.

In accordance with the eighth aspect of the present invention, since the front grill covering the forward side of the engine is arranged in the front portion of the hood, and the return spring elastically pressing the hood support body in the direction of returning to the initial position is provided, it is possible to widely leave open the forward side of the engine by integrally lifting up the front portion of the hood and the front grill, and it is possible to simply improve the maintenance workability of the engine attached part such as a battery, a radiator or the like arranged in the front side of the engine. Further, since the return spring force is applied in a direction moving rearward the hood, even if the operator grips the front grill in the front side of the traveling machine body and pushes the hood rearward in the case of finishing the maintenance work, the push operating force of the worker is lightened by the return spring force. In other words, it is possible to lower a deforming force of the front grill generated by the pushing operation of the worker. The worker can simply close the hood while gripping the front grill.

In accordance with the ninth aspect of the present invention, since the steering hydraulic mechanism is arranged in the traveling machine body, the universal joint coupling the handle shaft of the control handle is provided to the operating shaft of the steering hydraulic mechanism, and the universal joint is arranged on the shaft center line of the brake operating shaft, the cabin and the control handle are rotated around the brake operating shaft (the same shaft center line). It is possible to rotate the cabin around the cabin support body serving as the supporting point, without disassembling the coupling mechanism between the control handle and the steering hydraulic mechanism. It is possible to couple the control handle to the steering hydraulic mechanism by the simple coupling mechanism.

BRIEF DESCRIPTION OF THE DRAWINGS

FIG. 9 is a plan view showing a layout of a drive operating mechanism such as a pedal or the like;
FIG. 10 is a side elevational view showing an attaching structure such as a brake pedal or the like.

DESCRIPTION OF REFERENCE NUMERALS

Figure 1:
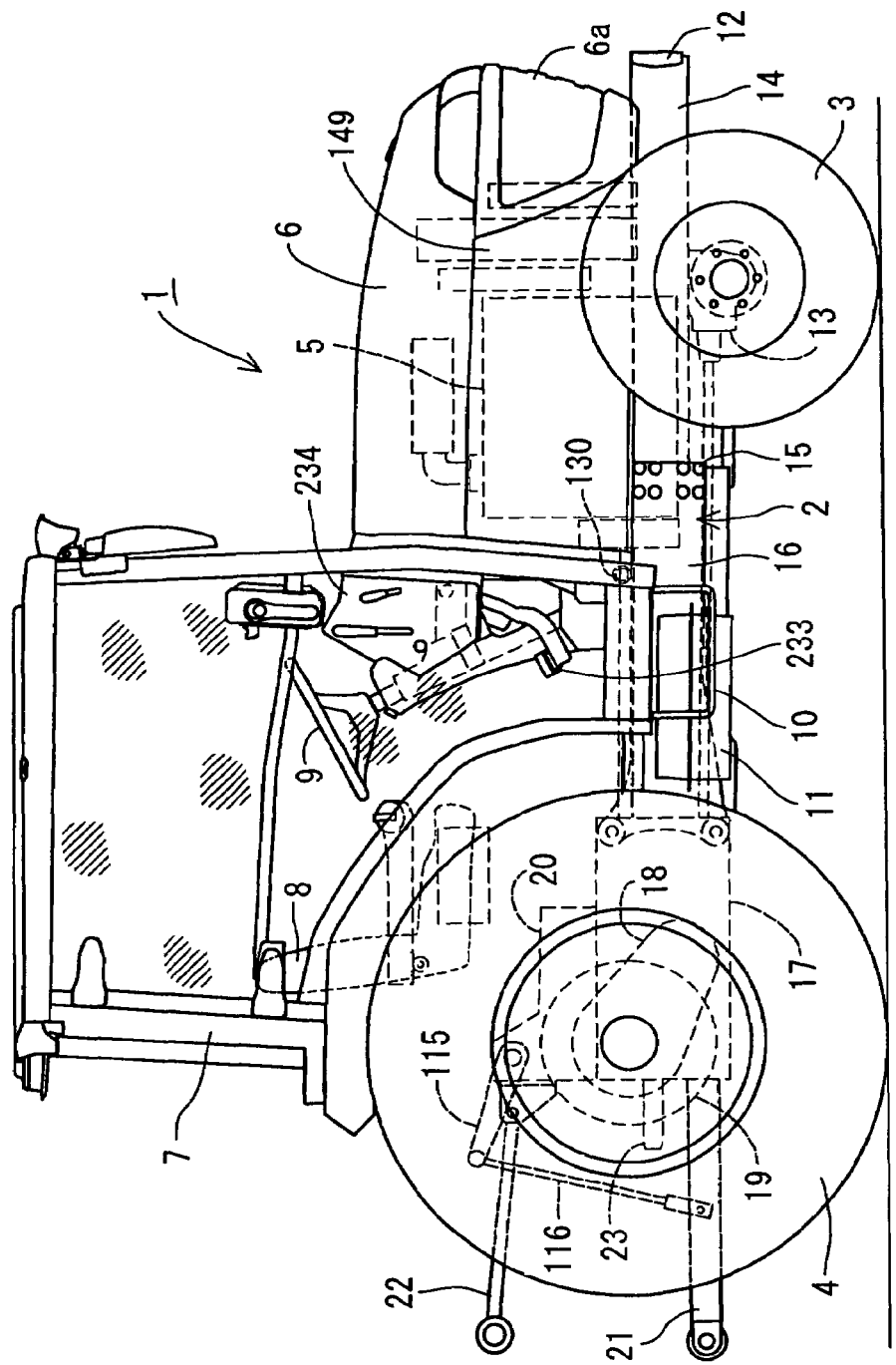
FIG. 1 is a side elevational view of a tractor for a farm work.

2 Traveling machine body
3 Front wheel (traveling portion)
4 Rear wheel (traveling portion)
5 Engine
6 Hood
6a Front grill
7 Cabin
8 Control seat
9 Control handle
18 Rear axle case
20 Lifting mechanism for working machine (hydraulic lifting mechanism)
21 Lower link (link mechanism)
22 Top link (link mechanism)
65 Brake (brake body)
115 Lift arm
116 Lift rod
130 Brake operating shaft
145 Engine support frame
150 Hood opening and closing supporting point shaft
159 Opening and closing supporting point frame (hood support body)
160 Hook lever (lock mechanism)
170 Tension spring (return spring)
177 Handle shaft
179 Power steering input shaft (operating shaft)
181 Universal joint
183 Cabin support body
186 Cabin frame
187 Cabin bottom plate
192 Upthrow body
193 Contact body
195 Cabin support stand
196 Stand fixing device
202 Power steering hydraulic mechanism
230 Brake pedal
251 Brake link mechanism (brake operating mechanism)

BEST MODE FOR CARRYING OUT THE INVENTION

Figure 3:
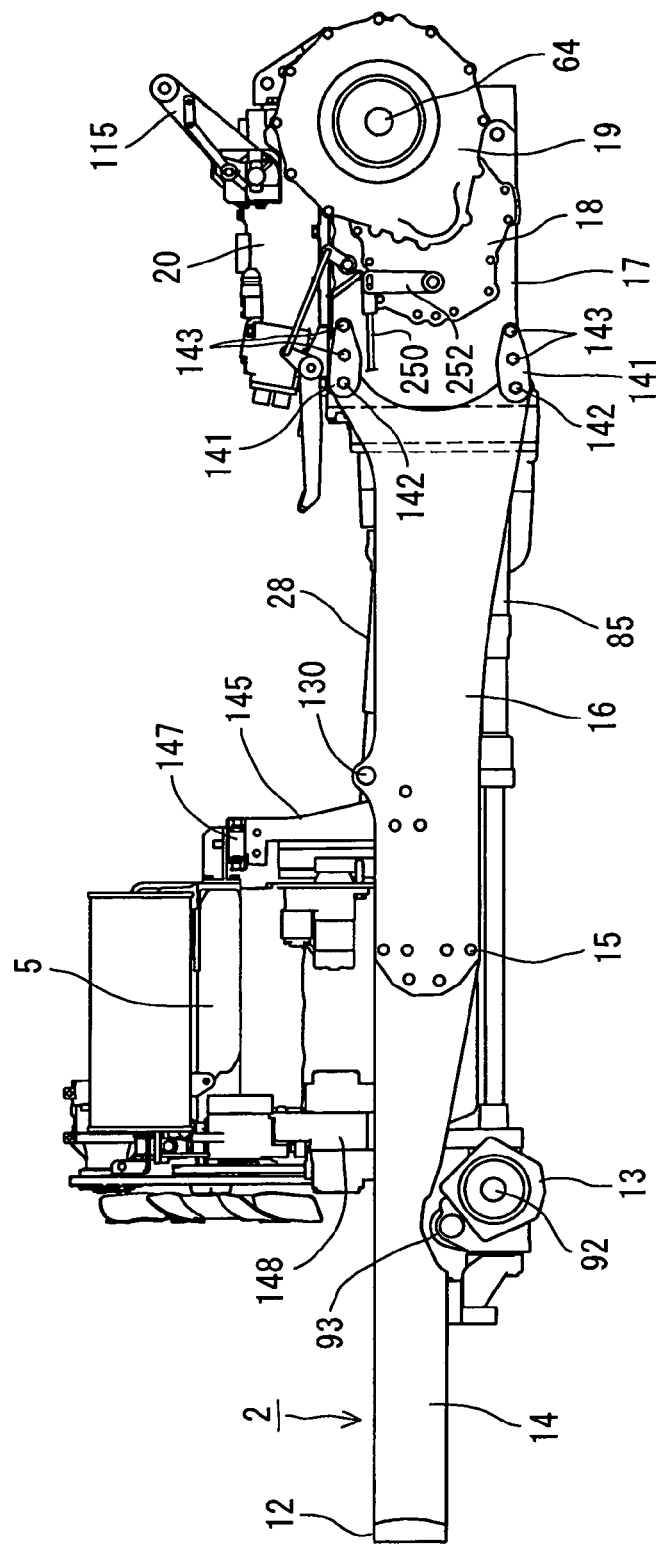
FIG. 3 is an explanatory view of a side face of a traveling machine body.
Figure 4:
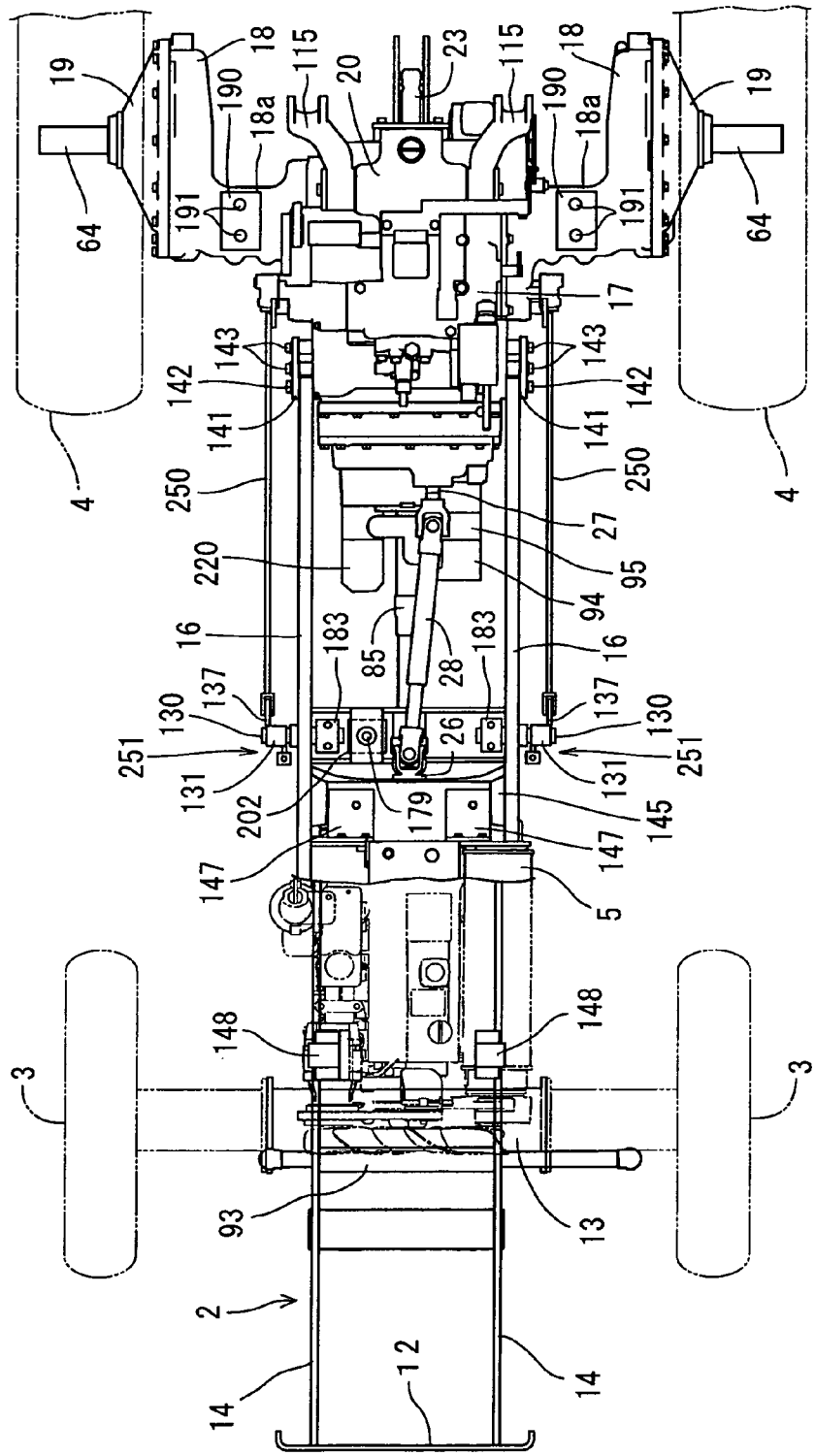
FIG. 4 is an explanatory view of a plane of the traveling machine body.
Figure 5:
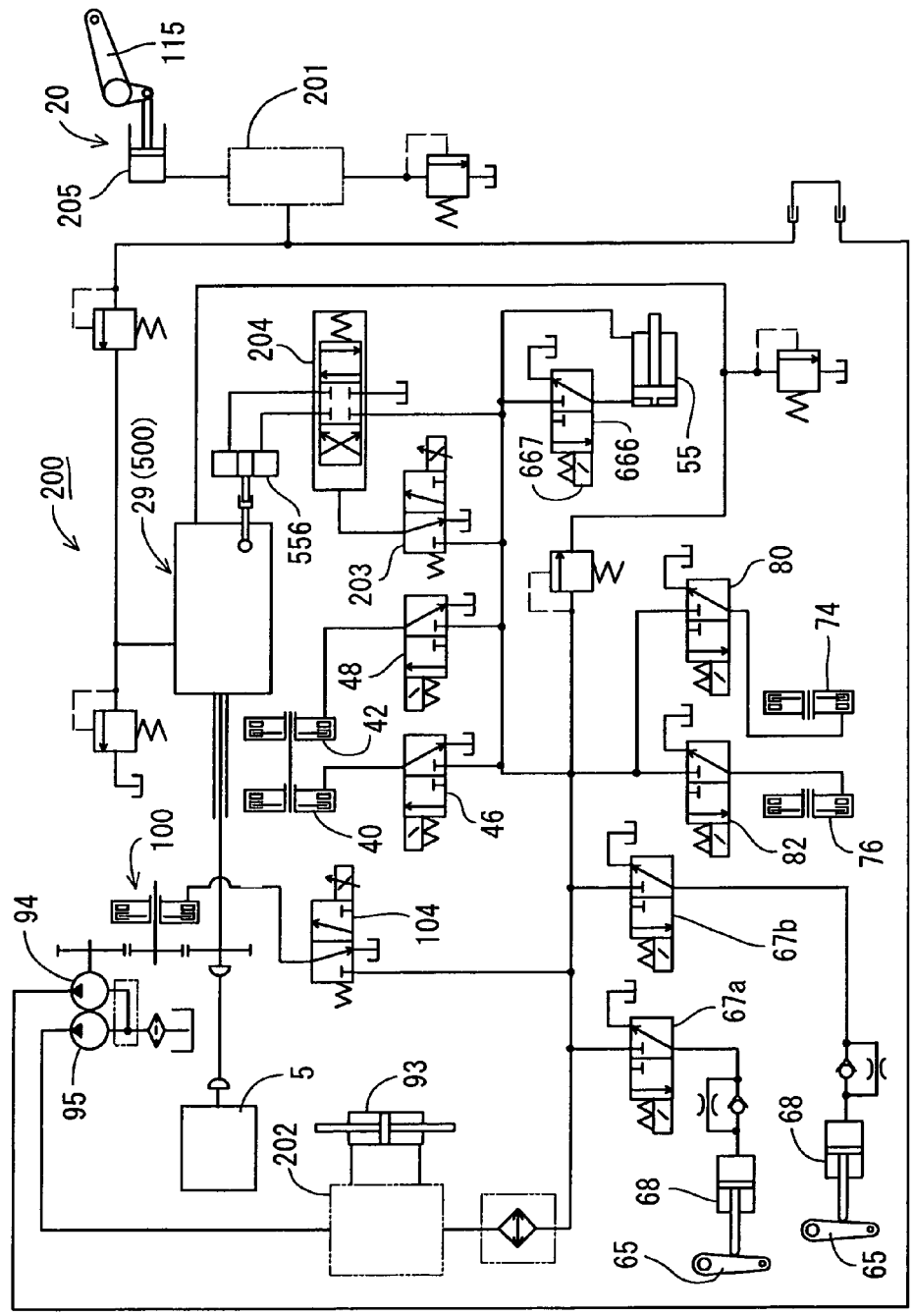
FIG. 5 is a hydraulic circuit view in a whole of the tractor.
Figure 6:
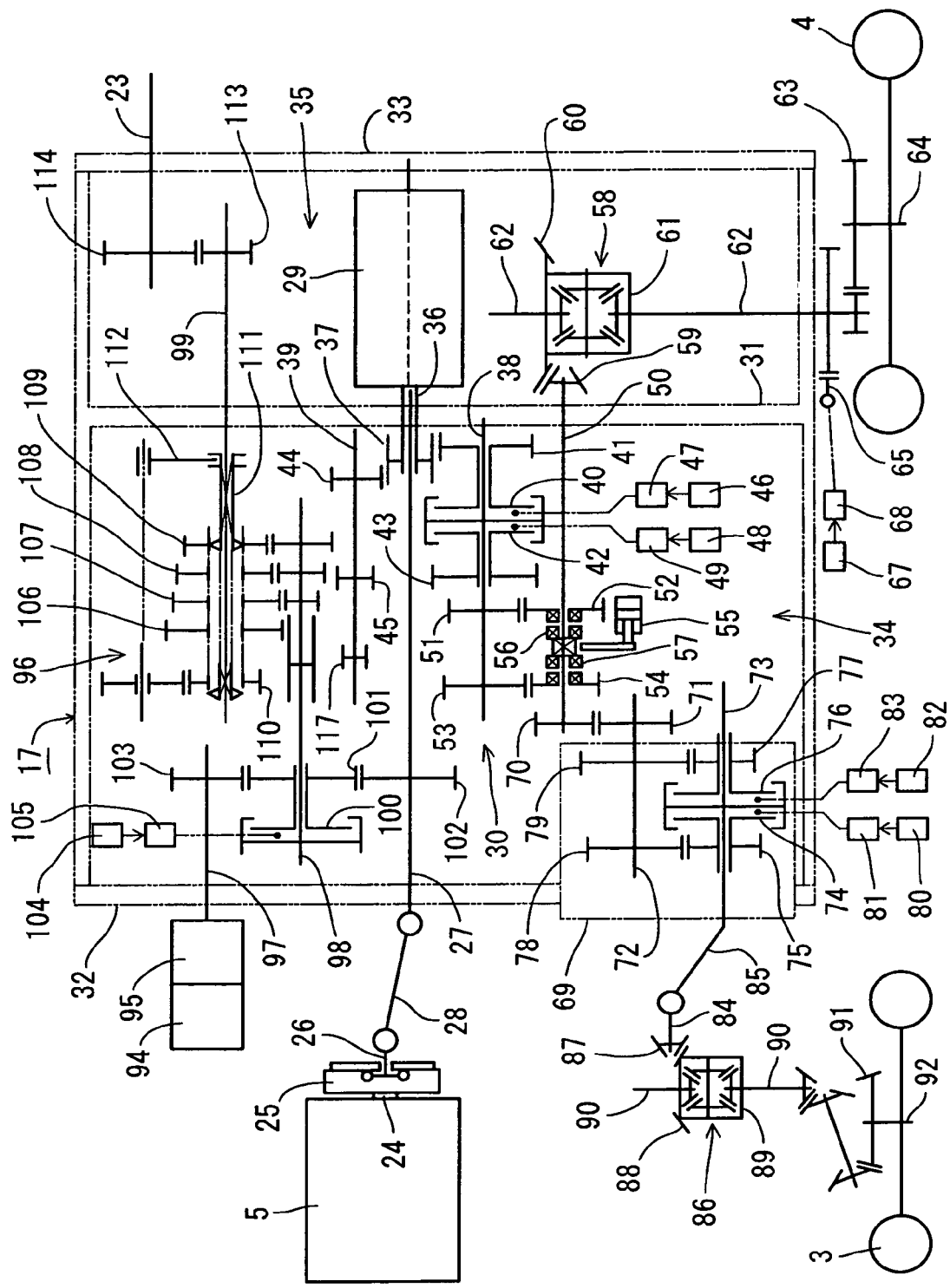
FIG. 6 is a skeleton view of a power transmission.
Figure 7:
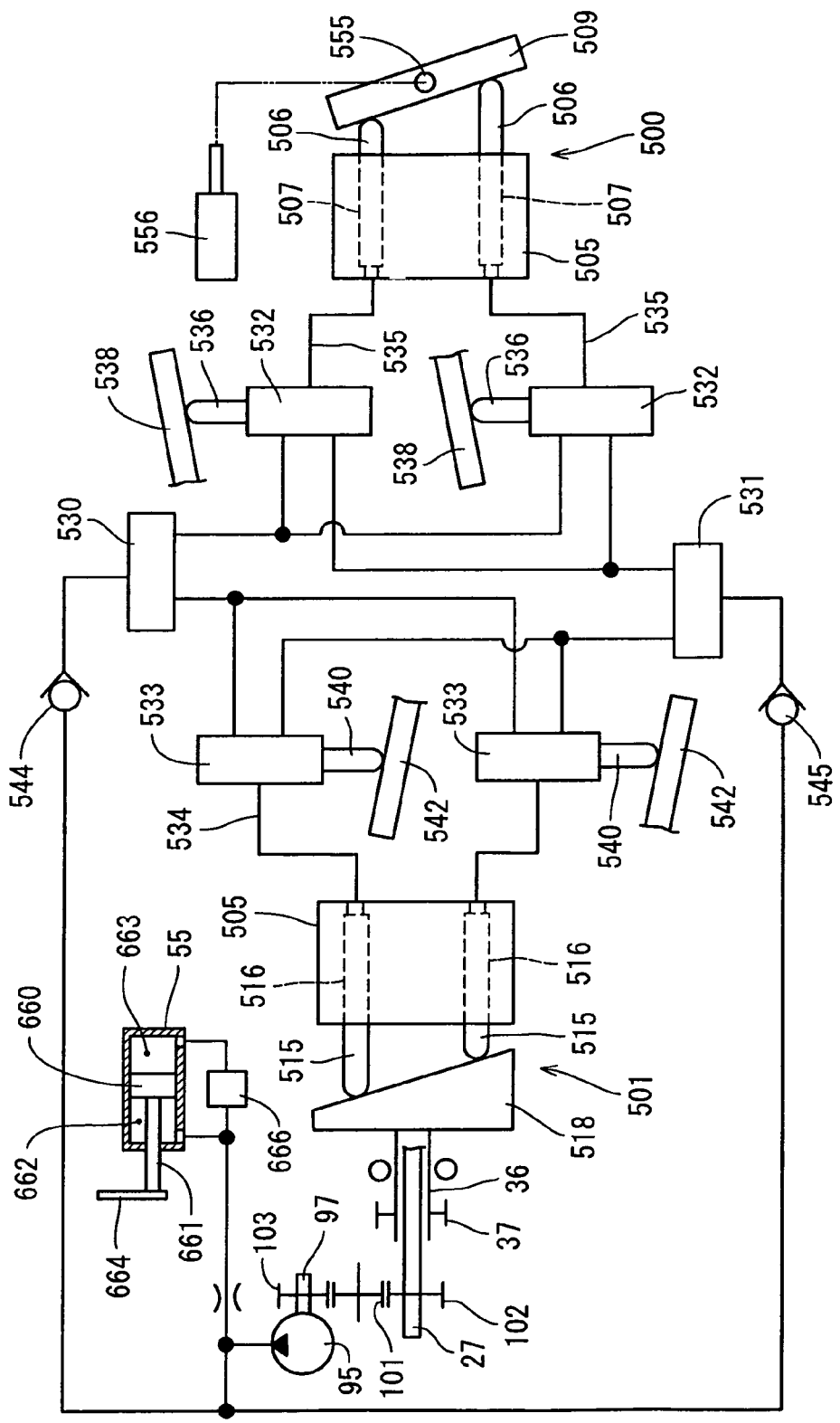
FIG. 7 is a hydraulic circuit view of a variable speed changer.
Figure 8:
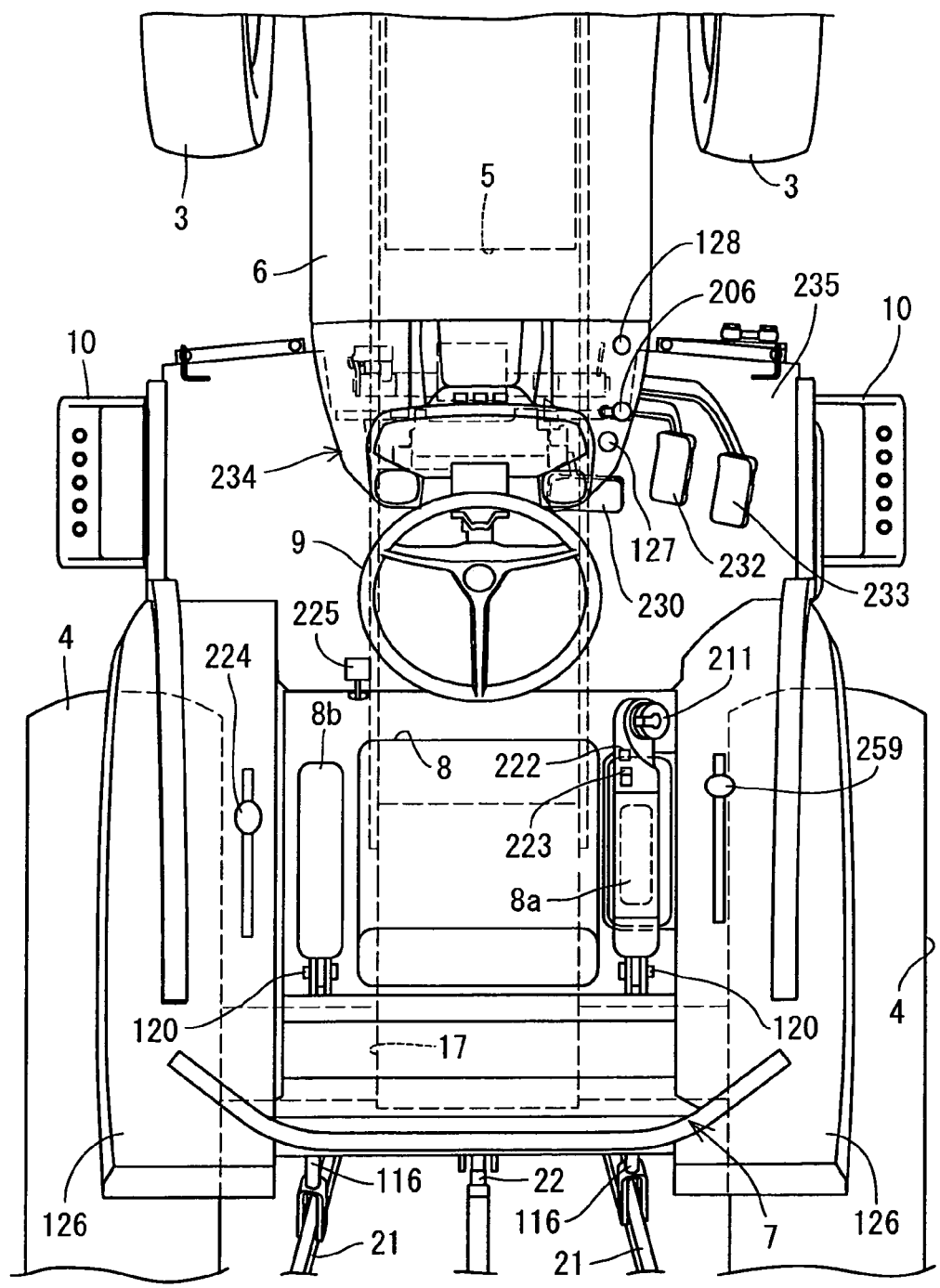
FIG. 8 is a plan view showing a cabin of the tractor.
Figure 9:
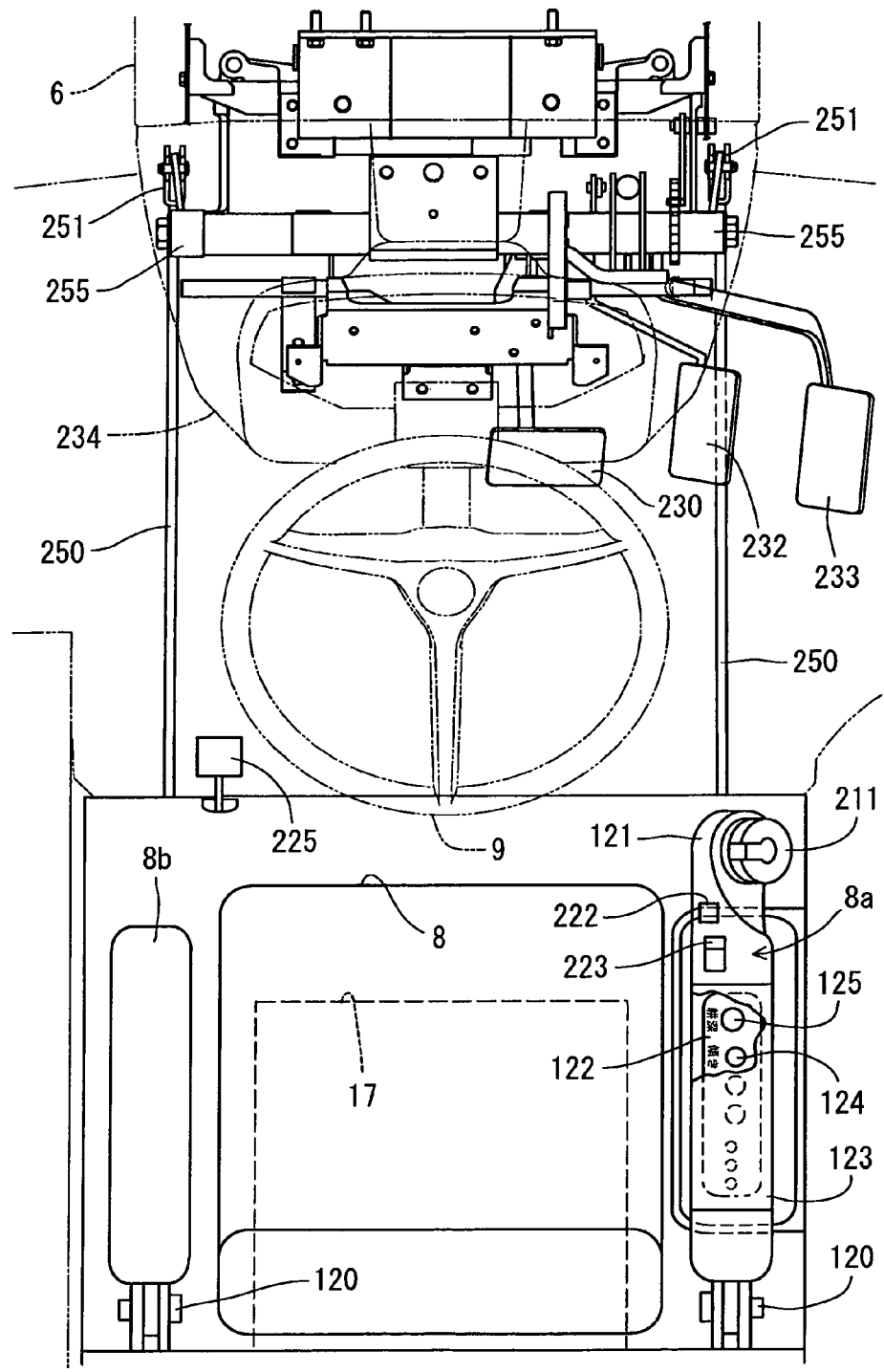

A description will be given below of an embodiment obtained by embodying the present invention with reference to the accompanying drawings (FIGS. 1 to 21). FIG. 1 is a side elevational view of a tractor for a farm work, FIG. 2 is a perspective view in which the tractor is seen from an obliquely rearward side, FIG. 3 is an explanatory view of a side face of a traveling machine body, FIG. 4 is an explanatory view of a plane of the traveling machine body, FIG. 5 is a hydraulic circuit view in a whole of the tractor, FIG. 6 is a skeleton view of a power transmission, FIG. 7 is a hydraulic circuit view of a variable speed changer, FIG. 8 is a plan view showing a cabin of the tractor, and FIG. 9 is an enlarged plan view of FIG. 8.

Figure 2:
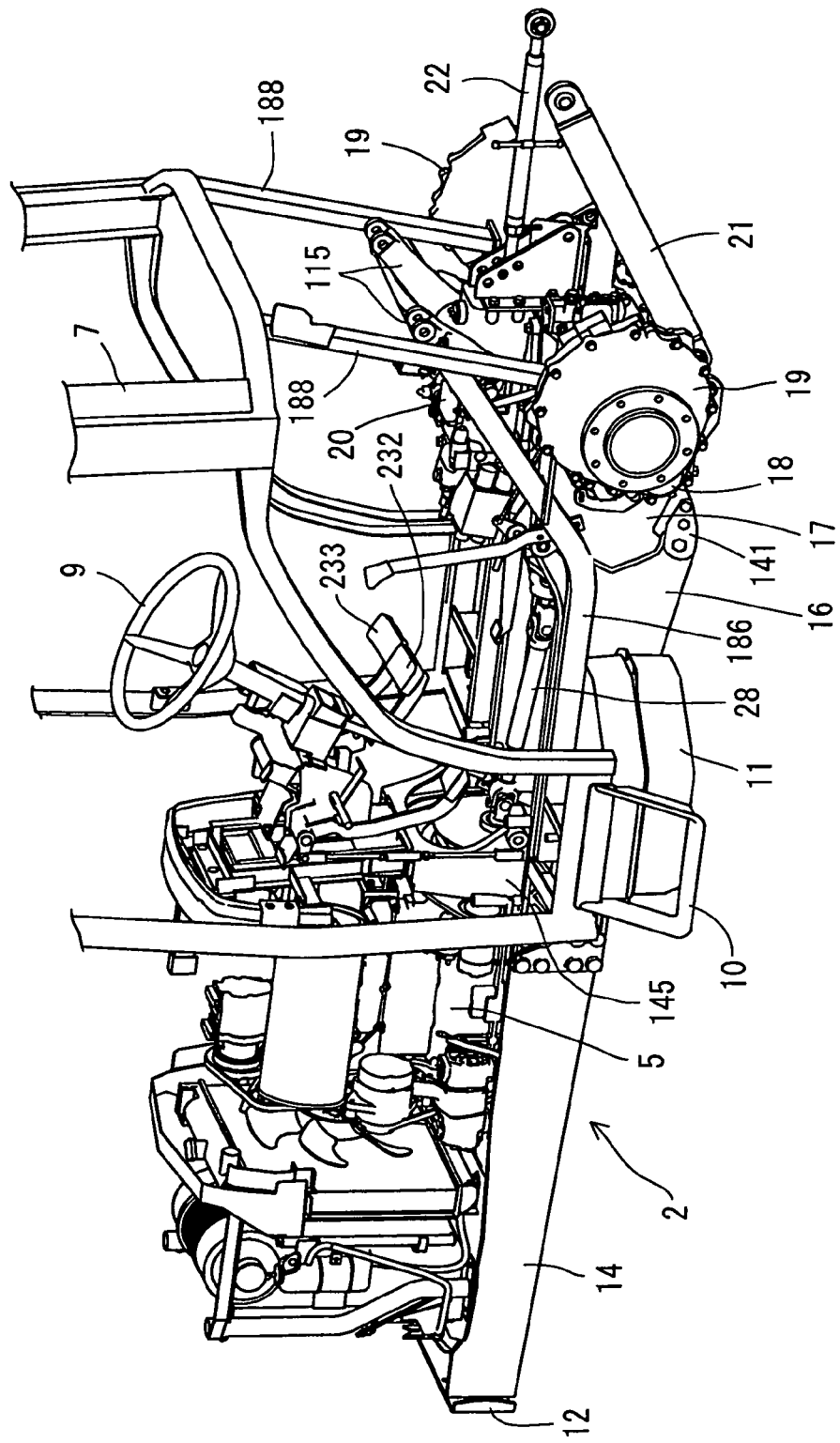
FIG. 2 is a perspective view of an obliquely rearward side of the tractor.

As shown in FIGS. 1 and 2, a tractor 1 serving as a working vehicle with cabin is structured so as to travel forward and backward by supporting a traveling machine body 2 by a pair of right and left front wheels 3 and a pair of right and left rear wheels 4, and driving the rear wheels 4 and the front wheels 3 by an engine 5 mounted to a front portion of the traveling machine body 2. In this case, a pair of right and left traveling portions are constructed by a set of the front and rear wheels 3 and 4 positioned in a left side in a forward moving direction of the traveling machine body 2, and a set of the front and rear wheels 3 and 4 positioned in a right side in the forward moving direction.

The engine 5 is covered by a hood 6. Further, a cabin 7 is installed in an upper face of the traveling machine body 2, and a control seat 8 seating an operator, and a control column 234 positioned in a forward side of the control seat 8 are mounted to an inner portion of the cabin 7. A control handle 9 (a round handle) serving as a steering means is provided in an upper portion of the control column 234. The structure is made such that the operator seated on the control seat 8 rotationally operates the control handle 9, whereby a steering angle (a direction changing angle) of the right and left front wheels 3 is changed in proportion to an amount of operation (an amount of rotation). A pair of right and left steps 10 for making the operator get on and off are provided in right and left outside portions of the cabin 7, and a fuel tank 11 supplying a fuel to the engine 5 is provided in an inner side of the step 11 and a lower side than a bottom portion of the cabin 7.

Further, the traveling machine body 2 is constructed by an engine frame 14 having a front bumper 12 and a front axle case 13, and right and left machine body frames 16 detachably fixed to a rear portion of the engine frame 14 by bolts 15. A transmission case 17 for appropriately changing an output from the engine 5 so as to transmit to the rear wheels 4 (the front wheels 3) is coupled to a rear portion of the machine body frames 16. In this case, the rear wheel 4 is attached to the transmission case 17 via a rear axle case 18 installed in such a manner as to protrude outward from an outside surface of the transmission case 17, and a final gear case 19 installed to an outside end of the rear axle case 18.

A hydraulic working machine lifting mechanism 20 for moving up and down a working machine (not shown) such as a power tiller or the like is detachably mounted to an upper face in a rear portion of the transmission case 17. The working machine such as the power tiller or the like is coupled to the rear portion of the transmission case 17 via a lower link 21 and a top link 22 so as to be movable up and down. In other words, a lift arm 115 is arranged in the working machine lifting mechanism 20. The lower link 21 is coupled to the lift arm 115 via a lift rod 116. Further, a PTO shaft 23 driving the working machine is provided in a rear side surface of the transmission case 17.

Figure 11:
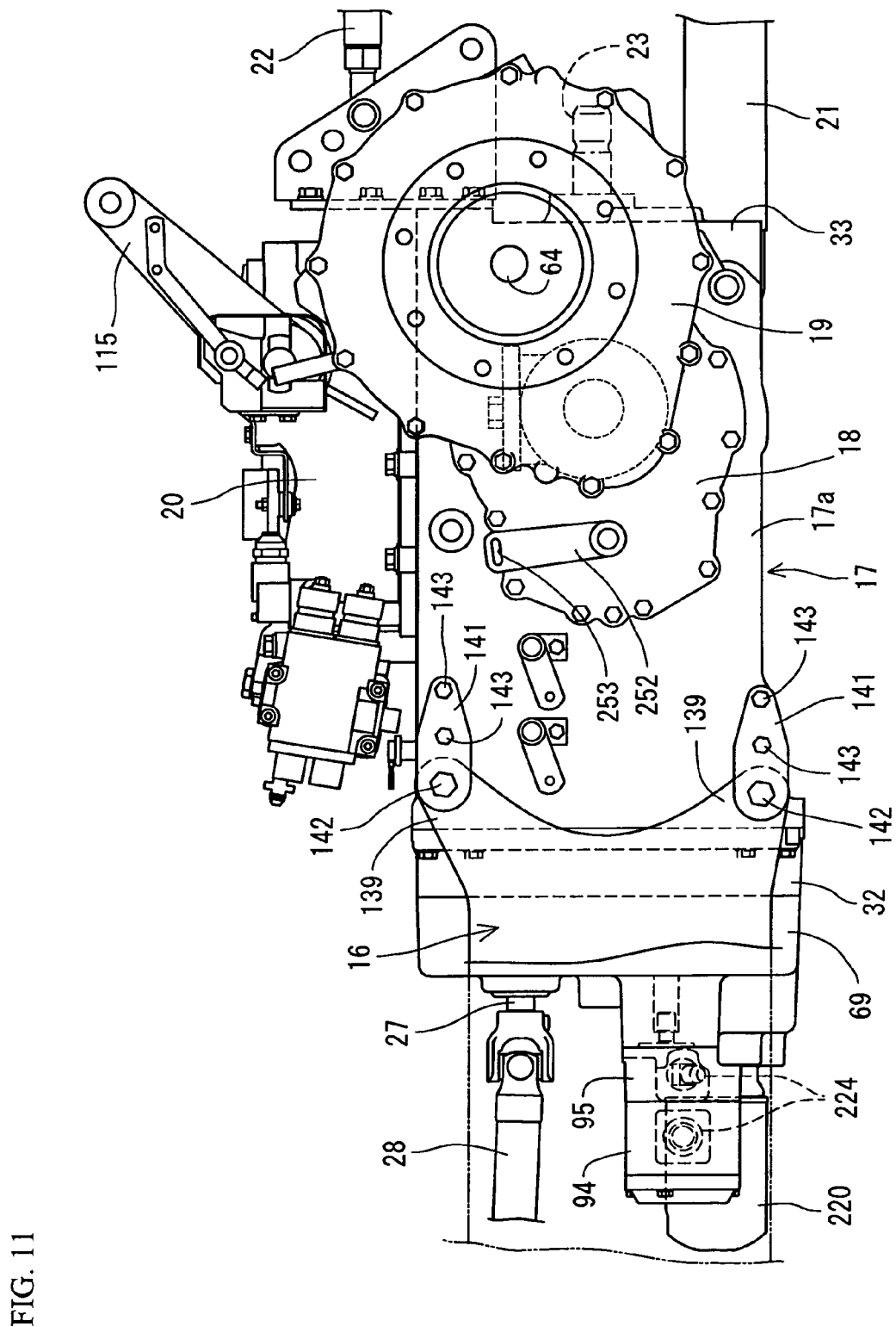
FIG. 11 is a side elevational view of an outer appearance of a transmission case.
Figure 12:
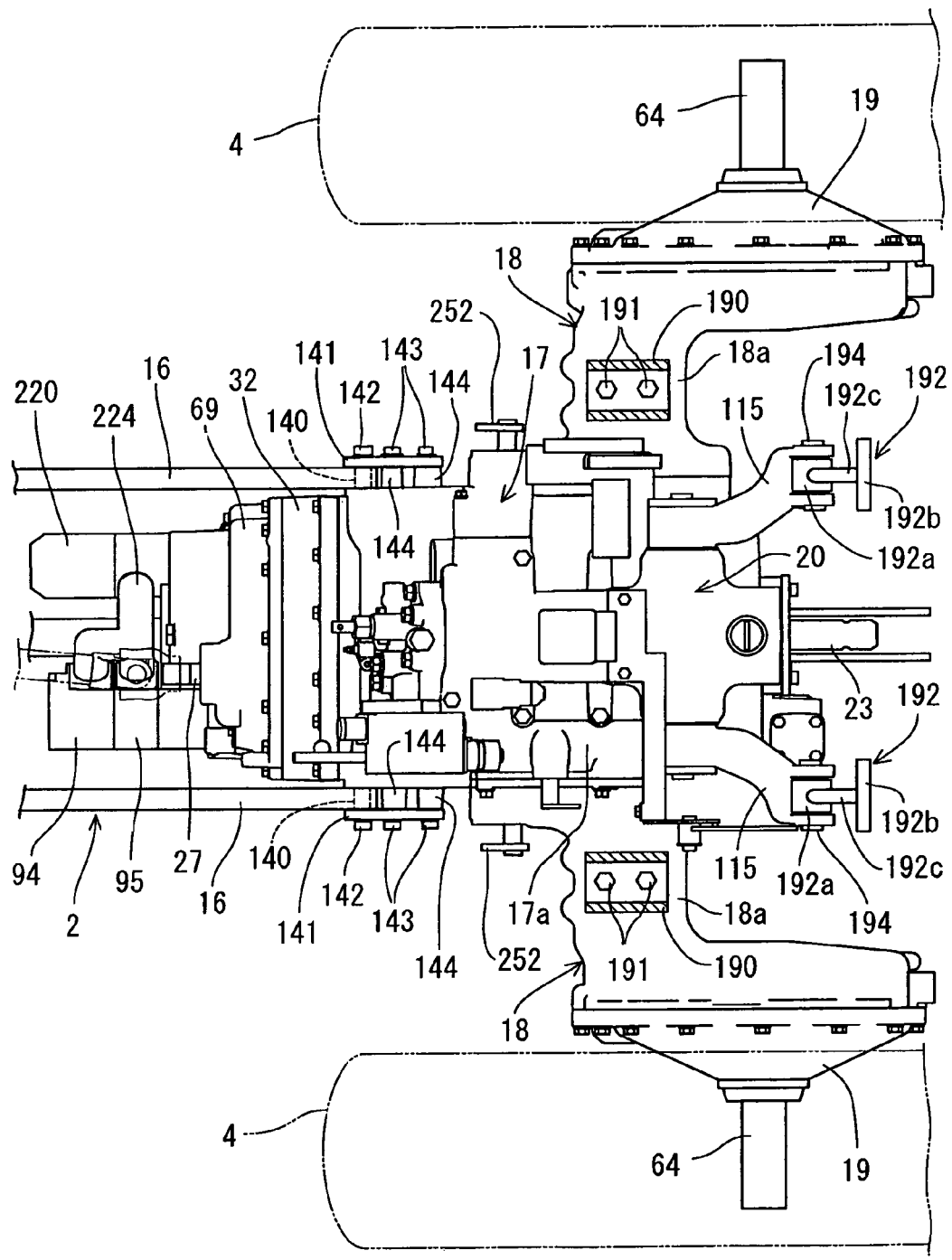
FIG. 12 is a plan view of the outer appearance of the transmission case.

Next, a description will be given of a rear portion structure of the traveling machine body 2 coupling the machine body frame 16 and the transmission case 17 with reference to FIGS. 3, 4, 11 and 12. Upper and lower coupling boss portions 139 are integrally formed in rear end portions of the right and left machine body frames 16 made of a steel plate. As shown in FIGS. 11 and 12, the coupling boss portion 139 is fitted onto a tubular frame pin 140. A pin fastening member 141 is fitted onto one end side of the frame pin 140 (refer to FIG. 12). The frame pin 140 and the pin fastening member 141 are fixed by a welding process. The machine body frame 16 is attached to a side face of the transmission case 17 via one fastening bolt 142 passing through an internal hole of the frame pin 140, and two fixing bolts 143 passing through an attaching hole of the pin fastening member 141.

As shown in FIG. 12, the fixing bolts 143 are screwed to the side face of the transmission case 17 via a spacer 144. The cylindrical spacer 144 is fitted onto the fixing bolts 143 between the side face of the transmission case 17 and the fastening member 141. The pin fastening member 141 is firmly attached to the side face of the transmission case 17 via the fixing bolts 143. Accordingly, the machine body frame 16 is separated from the side face of the transmission case 17 by taking the fastening bolt 142 and the fixing bolts 143 out and detaching the pin fastening member 141 from the side face of the transmission case 17.

FIG. 5 shows a hydraulic circuit 200 of the tractor 1 in the present embodiment. The hydraulic circuit 200 of the tractor 1 is provided with a hydraulic pump 94 for the working machine (the elevating mechanism 20) and a hydraulic pump 95 for traveling that are activated by a rotating force of the engine 5. The hydraulic pump 95 for traveling is connected to a hydraulic cylinder 93 for a power steering by the control handle 9 via a power steering hydraulic mechanism 202, and is connected to right and left brake electromagnetic valves 67a and 67b serving as a switching valve actuating each of brake cylinders 68 for brakes 65 for the pair of right and left rear wheels 4.

Further, the hydraulic pump 95 for traveling is connected to a PTO clutch hydraulic electromagnetic valve (a proportional control valve) 104 for a PTO clutch 100, a proportional control valve 203 with respect to a main shifting hydraulic variable transmission 29 mentioned below and a main shift switching valve 204 activated thereby, a high speed clutch electromagnetic valve 666 with high speed switching solenoid 667 actuating a traveling sub shifting hydraulic cylinder 55, a forward moving clutch electromagnetic valve 46 and a backward moving clutch electromagnetic valve 48 actuating a forward moving switching hydraulic clutch 40 and a backward moving switching hydraulic clutch 42 of the traveling machine body 2, a four-wheel drive hydraulic electromagnetic valve 80 with respect to a four-wheel driving hydraulic clutch 74 for simultaneously driving the front wheels 3 and the rear wheels 4, and a double speed hydraulic electromagnetic valve 82 with respect to a double speed hydraulic clutch 76 for switching the front wheels 3 to a double speed drive.

Further, the hydraulic pump 94 for the working machine is connected to a lift control electromagnetic valve 201 for supplying a working fluid to a single acting working machine lifting hydraulic cylinder 205 in the working machine lifting mechanism 20. In other words, the working machine lifting hydraulic cylinder 205 is actuated by switching the lift control electromagnetic valve 201. The lift arm 115 is rotated on the basis of a control of the working machine lifting hydraulic cylinder 205, thereby moving up and down the working machine coupled to the lower link 21. In this case, a charge oil is supplied to the hydraulic variable transmission 29 from the hydraulic pump 94 for the working machine. Further, the hydraulic circuit 200 is provided with a relief valve, a flow rate regulating valve, a check valve, an oil cooler, an oil filter, and the like.

FIG. 6 shows a transmission mechanism (the transmission case 17) from the engine 5 driving the rear wheels 4 and the front wheels 3. An internal portion of the transmission case 17 is comparted back and forth by a partition wall 31. A front side wall member 32 and a rear side wall member 33 are detachably fixed to a front side and a rear side of the transmission case 17. The transmission case 17 is constructed as an approximately rectangular box shape, and a front chamber 34 and a rear chamber 35 are formed in an internal portion of the transmission case 17. The front chamber 34 and the rear chamber 35 are communicated in such a manner that a working fluid (a lubricating oil) in their internal portions move each other. The front side wall member 32 is provided with a front wheel drive case 69 mentioned below. A traveling sub shift gear mechanism 30 and a PTO shift gear mechanism 96 that are mentioned below are arranged in the front chamber 34. A hydraulic variable transmission 29 corresponding to a traveling main shift mechanism, and a differential gear mechanism 58 that are mentioned below are arranged in the rear chamber 35.

An engine output shaft 24 protrudes rearward from a rear side surface of the engine 5, and a flywheel 25 is directly connected to the engine output shaft 24. A main driving shaft 26 protruding rearward from the flywheel 25 and a main shift input shaft 27 protruding forward from a front face of the transmission case 17 are coupled via a power transmission shaft 28 which is provided with universal couplings in both ends and can expand and contract. The structure is made such as to transmit a rotational power of the engine 5 to the main shift input shaft 27, next shift appropriately by the hydraulic variable transmission 29 and the traveling sub shift gear mechanism 30, and transmit the driving force to the rear wheels 4 via the differential gear mechanism 58. Further, the structure is made such as to transmit the rotation of the engine 5 appropriately shifted by the traveling sub shift gear mechanism 30 to the front wheels 3 via the front wheel drive case 69 and the differential gear mechanism 86 of the front axle case 13

As shown in FIGS. 6 and 7, the inline type hydraulic variable transmission 29 provided in an inner portion of the rear chamber 35 is provided with a variable displacement type shifting hydraulic pump 500, and a fixed displacement type shifting hydraulic motor 501 actuating with a high-pressure oil from the hydraulic pump 500. A cylindrical main shift output shaft 36 is concentrically fitted onto the main shift input shaft 27. A rear end side of the main shift input shaft 27 is rotatably pivoted to the rear side wall member 33 via a bearing. A cylinder block 505 for the hydraulic pump 500 and the hydraulic motor 501 is fitted onto the main shift input shaft 27 between the partition wall 31 and the rear side wall member 33. In this case, the hydraulic pump 500 is arranged in a rear portion of the cylinder block 505 in an opposite side to an input side of the main shift input shaft 27. The hydraulic motor 501 is arranged in a front portion of the cylinder block 505 in the input side of the main shift input shaft 27.

A main shift output gear 37 for taking out a main shift output from the hydraulic variable transmission 29 is provided on the main shift output shaft 36. In this case, a front end and a rear end of the main shift output shaft 36 respectively protrude to the front chamber 34 and the rear chamber 35. An intermediate part of the main shift output shaft 36 is rotatably pivoted to the partition wall 31 via a ball bearing. The main shift output gear 37 is provided on a front end portion of the main shift output shaft 36. An input side (a front end side) of the main shift input shaft 27 is rotatably pivoted to a shaft hole of the main shift output shaft 36 via a roller bearing in such a manner as to protrude forward from the front end of the main shift output shaft 36.

As shown in FIG. 7, the hydraulic pump 500 is provided with a pump swash plate 509 angle of inclination of which can be changed with respect to an axis of the main shift input shaft 27, and a pump plunger 506 which is coupled to the pump swash plate 509. A first plunger hole 507 for arranging the pump plunger 506 so as to freely come in and out is formed in the cylinder block 505. The cylinder block 505 is provided with the same number of first spool valves 536 as the pump plungers 506. Further a first radial bearing 538 for actuating the first spool valve 536 is arranged so as to be inclined at a fixed angle of inclination with respect to the axis of the main shift input shaft 27.

On the other hand, the hydraulic motor 501 is provided with a motor swash plate 518 keeping the angle of inclination constant with respect to the axis of the main shift input shaft 27, a motor plunger 515 coupled to the motor swash plate 518, and a second plunger hole 516 arranging the motor plunger 515 so as to freely come in and out the cylinder block 505. The cylinder block 505 is provided with the same number of second spool valves 540 as the motor plungers 515. Further, a second radial bearing 542 for actuating the second spool valve 540 is arranged so as to be inclined at a fixed angle of inclination with respect to the axis of the main shift input shaft 27. The pump plungers 506 and the same number of motor plungers 515 are alternately arranged on the same circumference in a center of rotation of the cylinder block 505.

Further, a snap ring groove shaped first oil chamber 530 and a snap ring groove shaped second oil chamber 531 are formed in a shaft hole of the cylinder block 505 to which the main shift input shaft 27 is inserted. A first valve hole 532 and a second valve hole 533 which are arranged approximately at a uniform interval on the same circumference of the center of rotation are formed in the cylinder block 505. The first valve hole 532 and the second valve hole 533 are respectively communicated with the first oil chamber 530 and the second oil chamber 531. The first plunger hole 507 is communicated with the first valve hole 532 via a first oil path 535, and the second plunger hole 516 is communicated with the second valve hole 533 via a second oil path 534.

The first spool valves 536 inserted to the first valve holes 532 are arranged approximately at a uniform interval on the same circumference of the center of rotation of the cylinder block 505. A leading end of the first spool valve 536 protruding from the first valve hole 532 by an elastic pressure of a back pressure spring force is brought into contact with an outer ring side surface of the first radial bearing 538. Further, the structure is made such that the first spool valve 536 reciprocates at one time by one rotation of the cylinder block 505, and the first plunger hole 507 is alternately communicated with the first oil chamber 530 or the second oil chamber 531 via the first valve hole 532 and the first oil path 535.

Further, the second spool valves 540 inserted to the second valve holes 533 are arranged approximately at a uniform interval on the same circumference of the center of rotation of the cylinder block 505. A leading end of the second spool valve 540 protruding from the second valve hole 533 by an elastic pressure of a back pressure spring force is brought into contact with an outer ring side surface of the second radial bearing 542. Further, the structure is made such that the second spool valve 540 reciprocates at one time by one rotation of the cylinder block 505, and the second plunger hole 516 is alternately communicated with the first oil chamber 530 or the second oil chamber 531 via the second valve hole 533 and the second oil path 534. In this case, there are provided a first charge valve 544 replenishing the working fluid of the hydraulic pump 95 for traveling to the first oil chamber 530, and a second charge valve 545 replenishing the working fluid of the hydraulic pump 95 for traveling to the second oil chamber 531.

Further, the pump swash plate 509 is rotatably arranged in the attached position of the rear side wall member 33 via a tilt angle regulating supporting point 555. The pump swash plate 509 is structured such that the angle of inclination of the plate is freely regulated with respect to the axis of the main shift input shaft 27. There is provided a main shift hydraulic cylinder 556 corresponding to a main shift operating actuator changing the angle of inclination of the pump swash plate 509 with respect to the axis of the main shift input shaft 27 (refer to FIG. 7). The structure is made such that the angle of inclination of the pump swash plate 509 is changed by the main shift hydraulic cylinder 556, whereby a main shift motion of the variable transmission 29 is carried out.

A description will be given below of the main shift motion of the inline type hydraulic variable transmission 29. The main shift switching valve 204 is activated by the working fluid from the proportional control electromagnetic valve 203 activated in proportion to a pedaling amount of a forward moving pedal 232 or a backward moving pedal 233 serving as a change gear ratio actuating means (a shift pedal) mentioned below, the main shift hydraulic cylinder 556 (refer to FIG. 7) is controlled, and the angle of inclination of the pump swash plate 509 provided in the hydraulic pump 500 is changed with respect to the axis of the main shift input shaft 27.

When the angle of inclination of the pump swash plate 509 is approximately zero, a pressure of a discharge oil from the hydraulic pump 500 is maintained approximately zero, and the hydraulic motor 501 is not driven by the hydraulic pump 500. Accordingly, the cylinder block 505 fitted onto the main shift input shaft 27 and the motor swash plate 518 provided in the hydraulic motor 501 are rotated approximately at the same rotating speed in the same direction, the main shift output shaft 36 is rotated at approximately the same rotating speed as the main shift input shaft 27, and the rotating speed of the main shift input shaft 27 is transmitted to the main shift output gear 37 without being changed.

When the pump swash plate 509 is inclined to one direction (a positive angle of inclination) side with respect to the axis of the main shift input shaft 27, the motor swash plate 518 is driven in the same rotating direction as the cylinder block 505, the hydraulic motor 501 is actuated at an increased speed, and the main shift output shaft 36 is rotated at a higher rotating speed than the main shift input shaft 27. In other words, the rotating speed of the hydraulic motor 501 is added to the rotating speed of the main shift input shaft 27, and is transmitted to the main shift output gear 37. Accordingly, a main shift output (a traveling speed) from the main shift output gear 37 is changed in proportion to the angle of inclination (the positive angle of inclination) of the pump swash plate 509, in a range of a higher rotating speed than the rotating speed of the main shift input shaft 27, and comes to a highest traveling speed (vehicle speed) at the maximum inclination (the positive angle of inclination) of the pump swash plate 509.

In contrast, when the pump swash plate 509 is inclined to the other direction (a negative angle of inclination) side with respect to the axis of the main shift input shaft 27, the motor swash plate 518 is rotated in an inverse direction to the cylinder block 505, the hydraulic motor 501 is deceleration (inverse) actuated, the main shift output shaft 36 is rotated at a lower rotating speed than the main shift input shaft 27, and the rotating speed of the main shift input shaft 27 is decelerated so as to be transmitted to the main shift output gear 37. In other words, the rotating speed of the hydraulic motor 501 is subtracted from the rotating speed of the main shift input shaft 27 so as to be transmitted to the main shift output gear 37. Accordingly, the shift output (the traveling speed) from the main shift output gear 37 is changed in proportion to the angle of inclination (the negative angle of inclination) of the pump swash plate 509 in a range of a lower rotating speed than the rotating speed of the main shift input shaft 27, and comes to a lowest traveling speed (vehicle speed=zero) in the maximum inclination (the negative angle of inclination) of the pump swash plate 509. In this case, in the embodiment, the change gear ratio becomes zero (neutral=stop state) in the case that the negative angle of inclination of the pump swash plate 509 is approximately 11 degree. Further, it is set such that the change gear ratio becomes maximum (the highest speed) in the case that the positive angle of inclination is approximately 11 degree.

As shown in FIG. 6, in the front chamber 34 of the transmission case 17, there are arranged a forward moving gear 41 and a backward moving gear 43 for switching the forward movement and the backward movement of the traveling machine body 2, and a traveling sub shift gear mechanism 30 for switching a low speed and a high speed. A description will be given of the structure switching the forward movement and the backward movement via the forward moving gear 41 and the backward moving gear 43. A traveling counter shaft 38 and a reverse rotation shaft 39 are arranged in an inner portion of the front chamber 34 in which the main shift output gear 37 is arranged. The forward moving gear 41 and the rearward moving gear 43 are fitted onto the traveling counter shaft 38, to which the forward moving gear 41 is coupled via a wet type multiple disc hydraulic clutch 40 for switching to the forward movement, and the backward moving gear 43 is coupled via a wet type multiple disc hydraulic clutch 42 for switching to the backward movement. The forward moving gear 41 is engaged with the main shift output gear 37. The backward moving gear 43 is engaged with the main shift output gear 37 via a reverse rotation gear 44 provided on the reverse rotation shaft 39. In this case, an electromagnetic pickup type main shift output shaft rotation sensor (not shown) detecting the rotation of the main shift output gear 37 is installed in a rotation detecting gear 117 provided on the reverse rotation shaft 39 in an opposing manner.

Further, a forward moving clutch cylinder 47 is activated by a forward moving clutch electromagnetic valve 46 and the forward movement switching hydraulic clutch 40 is engaged on the basis of a pedaling operation of a forward moving pedal 232 mentioned below, whereby the main shift output gear 37 and the traveling counter shaft 38 are coupled via the forward moving gear 41. Further, a backward moving clutch cylinder 49 is activated by a backward moving clutch electromagnetic valve 48 and the backward movement switching hydraulic clutch 42 is engaged on the basis of a pedaling operation of a backward moving pedal 233 mentioned below, whereby the main shift output gear 37 and the traveling counter shaft 38 are coupled via the reverse rotation gear 44 and the reverse rotation output gear 45 provided on the reverse rotation shaft 39, and the backward moving gear 43 (refer to FIG. 6). In this case, the structure is made such that in the case of a neutral position where both the forward moving pedal 232 and the backward moving pedal 233 are not pedaled, both of the forward moving and backward moving hydraulic clutches 40 and 42 are disengaged, and the traveling drive force from the main shift output gear 37 output to the front wheel 3 and the rear wheel 4 becomes approximately zero (a main clutch disconnected state).

Next, a description will be given of a structure for switching to the low speed and the high speed via the traveling sub shift gear mechanism 30. As shown in FIG. 6, the traveling sub shift gear mechanism 30 and a sub shift shaft 50 are arranged in the front chamber 34 of the transmission case 17. The traveling counter shaft 38 is provided with a low speed gear 51 and a high speed gear 53 for the sub shift, and the sub shift shaft 50 is provided with an output side low speed gear 52 engaging with the input side low speed gear 51 of the traveling counter shaft 38, and an output side high speed gear 54 engaging with the input side high speed gear 53 of the traveling counter shaft 38. Further, the sub shift shaft 50 is provided with a low speed clutch 56 and a high speed clutch 57 which can be engaged and disengaged by the sub shift hydraulic cylinder 55. Further, the structure is made such that the low speed clutch 56 or the high speed clutch 57 is engaged in accordance with the control of the sub shift hydraulic cylinder 55, on the basis of an operation of a sub shift switching switch 222 serving as a sub shift means mentioned below, a detection of the rotating speed of the engine 5 or the like, the low speed gear 52 or the high speed gear 54 is coupled to the sub shift shaft 50, and the traveling drive force is output to the front wheels 3 and the rear wheels 4 from the sub shift shaft 50.

The rear end portion of the sub shift shaft 50 extends to an inner portion of the rear chamber 35 of the transmission case 17 while passing through the partition wall 31 (refer to FIG. 6). A differential gear mechanism 58 transmitting the traveling drive force to the right and left rear wheels 4 is arranged in an inner portion of the rear chamber 35. The differential gear mechanism 58 is provided with a ring gear 60 engaging with a pinion 59 in a rear end of the sub shift shaft 50, a differential gear case 61 provided in the ring gear 60, and a differential output shaft 62 extending in a lateral direction. The differential output shaft 62 is coupled to a rear axle 64 via a final gear 63 or the like, and drives the rear wheels 4 of the rear axle 64 (refer to FIG. 6). Further, right and left brakes 65 are installed respectively in the right and left differential output shafts 62, and a base end side of one brake pedal 230 in a rear face side of the control column 234 is rotatably coupled to a brake pedal shaft 255 (refer to FIGS. 4, 9 and 10). The brake pedal 230 and the right and left brakes 65 are mechanically coupled via a pair of right and left brake rods 250 and link mechanisms 251 and the like. In this case, a parking lever (not shown) or the like is provided for locking the brake pedal 230 at a braking position, and actuates the right and left brakes 65 as a parking brake. On the other hand, a brake cylinder 68 is activated by right and left brake electromagnetic valves 67a and 67b, on the basis of a detection of a steering angle of the control handle 9, and the brake 65 in an inner side of a swing motion is automatically activated to brake.

Next, a description will be given of a switching structure between a two-wheel drive and a four-wheel drive of the front and rear wheels 3 and 4. As shown in FIG. 6, a front wheel input shaft 72 and a front wheel output shaft 73 are provided in a front wheel driving case 69 provided in a front side wall member 32 of the transmission case 17. The front wheel input shaft 72 is coupled so as to be capable of transmitting a power with the sub shift shaft 50 via power transmission gears 70 and 71. Further, onto the front wheel output shaft 73, there are fitted a four-wheel drive gear 75 coupled to the front wheel output shaft 73 via a four-wheel driving hydraulic clutch 74, and a double speed gear 77 coupled to the front wheel output shaft 73 via a double speed hydraulic clutch 76. The four-wheel drive gear 75 is engaged with an input side four-wheel drive gear 78 of the front wheel input shaft 72, and the double speed gear 77 is engaged with an input side double speed gear 79 of the front wheel input shaft 72. Further, the structure is made such that a four-wheel drive clutch cylinder 81 is activated by a four-wheel drive hydraulic electromagnetic valve 80 and the four-wheel driving hydraulic clutch 74 is engaged by operating the switch lever (not shown) between the two-wheel drive and the four-wheel drive to the four-wheel drive side, the front wheel input shaft 72 and the front wheel output shaft 73 are coupled by the four-wheel drive gear 75, and the front wheels 3 are driven together with the rear wheels 4 (refer to FIG. 6).

Next, a description will be given of a switching structure of the double speed drive of the front wheels 3. The structure is made such that a double speed clutch cylinder 83 is activated by a double speed hydraulic electromagnetic valve 82 and the double speed hydraulic clutch 76 is engaged on the basis of a detection of a U-turn (change of direction in a head land of a farm field) operation of the control handle 9, the front wheel input shaft 72 and the front wheel output shaft 73 are coupled by the double speed gear 77, and the front wheels 3 are driven at a high speed which is about double in comparison with a speed at a time when the front wheels 3 are driven by the four-wheel drive gear 75 (refer to FIG. 6). In this case, an electromagnetic pickup type vehicle speed sensor (not shown) is installed for detecting the rotation of the gear 78, at a position near the gear 78 of the front wheel input shaft 72.

Next, a description will be given of a driving structure of the front wheels 3. As shown in FIG. 6, there are coupled a front wheel transmission shaft 84 protruding rearward from the front axle case 13 mentioned above, and the front wheel output shaft 73 protruding forward from the front face of the transmission case 17, via a front wheel drive shaft 85 transmitting the power to the front wheel 3. Further, a differential gear mechanism 86 transmitting the traveling drive force to the right and left front wheels 3 is arranged in an inner portion of the front axle case 13 mentioned above. The differential gear mechanism 86 is provided with a ring gear 88 engaging with a pinion 87 at a front end of the front wheel transmission shaft 84, a differential gear case 89 provided in the ring gear 88, and right and left differential output shafts 90. A front axle 92 is coupled to the differential output shaft 90 via a final gear 91 or the like, and is structured such that the front wheels 3 provided in the front axle 92 are driven.

Next, a description will be given of a structure for switching (between four forward rotation speeds and one reverse rotation speed) the driving speed of the PTO shaft 23. As shown in FIG. 6, the front chamber 34 of the transmission case 17 is provided with a PTO shift gear mechanism 96 for transmitting the power from the engine 5 to the PTO shaft 23, and a pump drive shaft 97 for transmitting the power from the engine 5 to each of hydraulic pumps 94 and 95. The PTO shift gear mechanism 96 is provided with a PTO counter shaft 98, and a PTO shift output shaft 99. A PTO input gear 101 is coupled to the PTO counter shaft 98 via a hydraulic type PTO clutch 100. An input side gear 102 of the main shift input shaft 27, and an output side gear 103 of the pump drive shaft 97 are engaged with the PTO input gear 101, and the pump drive shaft 97 is coupled to the main shift input shaft 27. Further, the PTO clutch cylinder 105 is activated by a PTO clutch hydraulic electromagnetic valve 104 (refer to FIGS. 5 and 6) and the hydraulic type PTO clutch 100 is engaged, in accordance with an operation of a PTO clutch switch 223 mentioned below or an operation of a PTO clutch lever (not shown), and the main shift input shaft 27 and the PTO counter shaft 98 are coupled via the input gear 101.

Further, onto the PTO shift output shaft 99, there are fitted a PTO first speed gear 106, a PTO second speed gear 107, a PTO third speed gear 108, a PTO fourth speed gear 109, and a PTO reverse rotation gear 110. A shift arm 112 coupled to a PTO shift lever 224 (refer to FIG. 8) is engaged with a shift shifter 111 for alternatively coupling each of the gears 106 to 110 to the PTO shift output shaft 99. Further, the structure is made such that each of PTO shift outputs including the first speed to the fourth speed and the reverse rotation is transmitted to the PTO shaft 23 from the PTO shift output shaft 99 via the transmission gears 113 and 114 on the basis of a shifting operation of the PTO shift lever 224 (refer to FIG. 6).

Next, a description will be given in detail of a shift structure of the traveling sub shift gear mechanism 30 with reference to FIGS. 6 and 7. As shown in FIG. 7, in the sub shift hydraulic cylinder 55, there are formed a first cylinder chamber 662 internally provided with a piston rod 661 in one side of a piston 660, and the other second cylinder chamber 663. The structure is made such as to engage the low speed clutch 56 or the high speed clutch 57 by a shift arm 664 in a leading end of the piston 660, and drive the sub shift shaft 50 at a low speed or a high speed. The first cylinder chamber 662 is communicated directly with a discharge side of the hydraulic pump 95 for traveling. The second cylinder chamber 663 is communicated with the discharge side of the traveling hydraulic pump 95 via a high speed clutch electromagnetic valve 666. The structure is made such as to switch the high speed clutch electromagnetic valve 666 by a shift solenoid 667, and engage the high speed clutch 57 so as to drive the sub shift shaft 50 at a high speed (refer to FIG. 5).

Next, a description will be given of a structure of an inner portion of the cabin 7 with reference to FIGS. 8 and 9. As shown in FIGS. 8 and 9, a step floor plate 235 is arranged in a forward side of the control seat 8 within the cabin 7. The control handle 9 is arranged in an upper face side of the control column 234 on the step floor plate 235. In a right side face side of the control column 234, there are arranged a throttle lever 206 regulating the rotating speed of the engine 5, an accelerator coupling lever 127 coupling the forward moving pedal 232 and the backward moving pedal 233 to an accelerator mechanism of the engine 5, and a pedal lock lever 128 maintaining the forward moving pedal 232 and the backward moving pedal 233 in an approximately constant attitude. Further, the brake pedal 230, the forward moving pedal 232 and the backward moving pedal 233 are arranged in parallel below a right side of the control column 234. The PTO shift lever 224 is arranged in a fender 126 (a left side of the control seat 8) in a left side of the cabin 7. A differential lock pedal 225 locking the differential gear mechanism 58 is arranged in a left side of the control seat 8. A working machine lifting lever 259 for actuating the lifting mechanism 20 is arranged in the fender 126 (a right side of the control seat 8) in a right side of the cabin 7.

As shown in FIG. 9, a dial installation table 121 is integrally formed in accordance with a synthetic resin molding work in a front end side of a synthetic resin right arm rest 8a in a right side of the control seat 8. A vehicle speed setting dial 211, a sub shift switching switch 222 and a PTO clutch switch 223 are arranged in the dial installation table 121. The operator seated on the control seat 8 puts a right arm on the right arm rest 8a, and the operator controls the vehicle speed setting dial 211, the sub shift switching switch 222 or the PTO clutch switch 223 by the right hand.

As shown in FIG. 7, a working machine attitude controller 122 is arranged in an internal portion of the right arm rest 8a in which an upper face side is closed by an upper face lid 123 which can be opened and closed. In the working machine attitude controller 122, there are arranged an inclination dial 124 regulating an inclination in a lateral direction of a rotary power tiller working machine (not shown), a power tiller dial 125 regulating a power tiller depth of a power tiller pawl (not shown) of the rotary power tiller working machine, and the like. The operator seated on the control seat 8 controls the inclination dial 124, the power tiller dial 125 or the like by the right hand. In this case, the rotary power tiller working machine is coupled via the lower link 21 and the top link 22. Further, the right arm rest 8a and the left arm rest 8b of the control seat 8 are provided in such a manner as to be capable of lifting up (giving way to an approximately vertical attitude from an approximately horizontal attitude) the front end side around the rotating support shaft 120 in a rear end side thereof.

Figure 10:
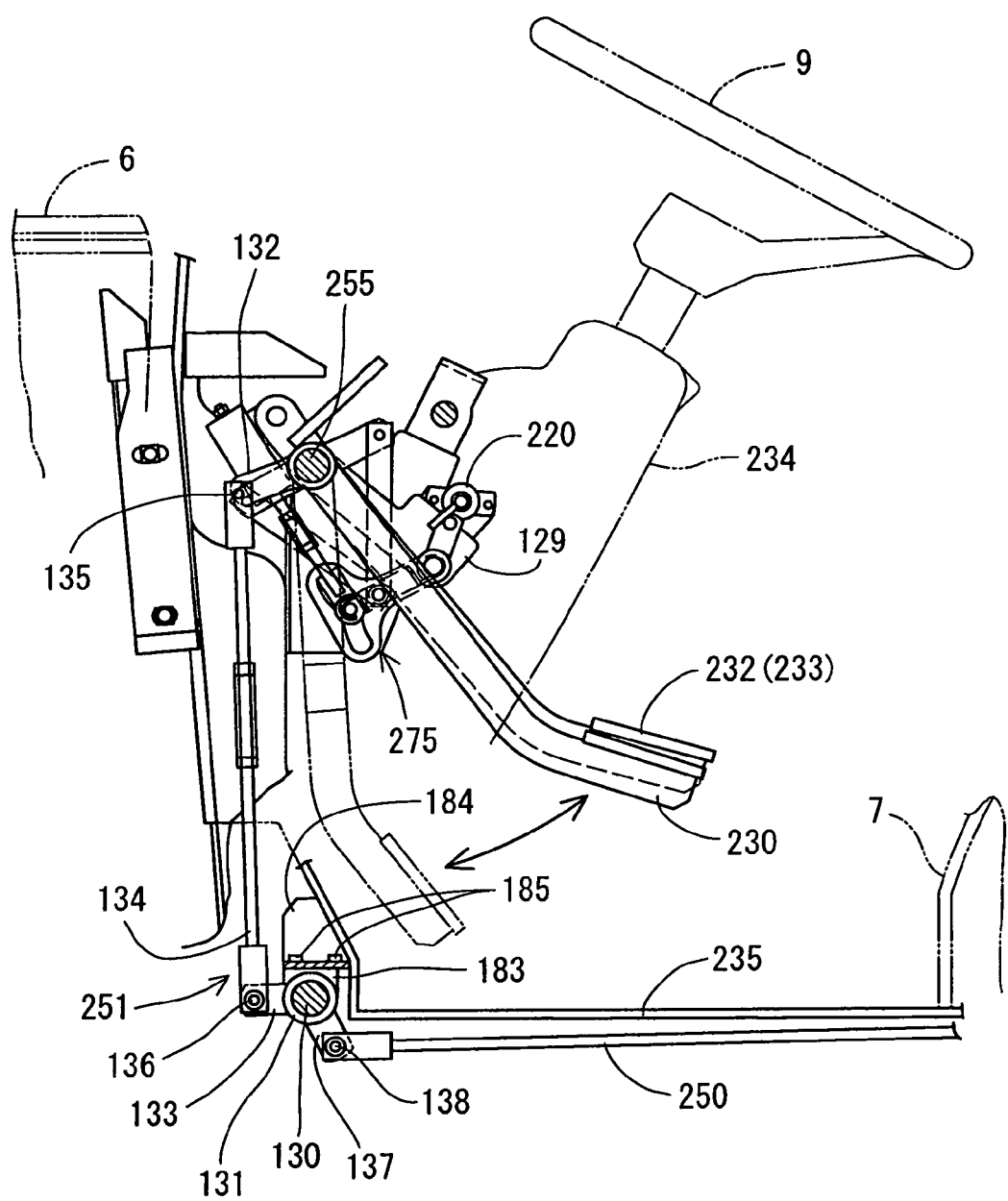

As shown in FIG. 10, the brake pedal shaft 255 mentioned above is rotatably pivoted to a column frame 129 provided in the control column 234. A base end side of the brake pedal 230 is connected to the brake pedal shaft 255. Further, base end sides of the forward moving pedal 232 and the backward moving pedal 233 are rotatably fitted onto the brake pedal shaft 255. A step board of the brake pedal 230 and step boards of the forward moving pedal 232 and the backward moving pedal 233 are installed to so as to be capable of pedaling obliquely downward from an initial (neutral) position around the brake pedal shaft 255 on an upper face of the step floor plate 235.

The column frame 129 is provided with a shift potentiometer 220 serving as a shift sensor detecting a pedaling amount of the forward moving pedal 232 and the backward moving pedal 233. The shift potentiometer 220 is coupled to the forward moving pedal 232 and the backward moving pedal 233 via a transmission link mechanism 275. In the case that the pedaling amount of the forward moving pedal 232 and the backward moving pedal 233 is transmitted to the shift potentiometer 220 via the transmission link mechanism 275, the proportional control valve 203 is activated on the basis of a detection value of the shift potentiometer 220. The proportional control valve 203 switches the main shift switching valve, and actuates the main shift hydraulic cylinder 556. The main shift hydraulic cylinder 556 changes the angle of inclination of the pump swash plate 509 and switches the rotating speed of the main shift output shaft 36.

As shown in FIGS. 3, 4 and 10, right and left brake operating shafts 130 are arranged respectively in the right and left machine body frames 16 in the forward side of the step floor plate 235. Right and left brake operating boss bodies 131 are rotatably fitted onto outer end portions of the right and left brake operating shafts 130 protruding through the outside surfaces of the right and left machine body frames 16. Both end sides of a link rod 134 serving as the right and left brake link mechanism 251 are coupled respectively to a pedal shaft arm 132 of the brake pedal shaft 255 and a forward arm 133 of the right and left brake operating boss bodies 131 via coupling shafts 135 and 136. Front end sides of the right and left brake rods 250 are coupled respectively to downward arms 137 of the right and left brake operating boss bodies 131 via a coupling shafts 138.

Further, right and left brake levers 252 for actuating the right and left brakes 65 are arranged in right and left outside surfaces of the transmission case 17 (refer to FIG. 12). Rear end sides of the right and left brake rods 250 are coupled respectively to the right and left brake levers 252 via a long hole 253 and a pin shaft body 254 serving as a flexible mechanism (refer to FIG. 19). In other words, the right and left brake rods 250 are pulled approximately at the same time via the right and left link rods 134 by stepping down the brake pedal 230. Accordingly, the right and left brakes 65 are activated approximately at the same time via the right and left brake rods 250, and brake the right and left rear wheels 4. In the case that the brake rod 250 is pushed in an opposite direction (a backward moving direction) to a braking direction (a forward moving direction by the operation of the pedal 230), in other words, in the case that the brake lever 252 is moved forward with respect to the brake rod 250 at an approximately fixed position, the pin shaft body 254 moves within the long hole 253. In other words, since a forward pushing force is not applied to the brake rod 250, even if the brake lever 252 moves forward, it is possible to prevent the brake rod 250 or the like from being deformed and damaged by the forward movement of the brake lever 252.

Figure 16:
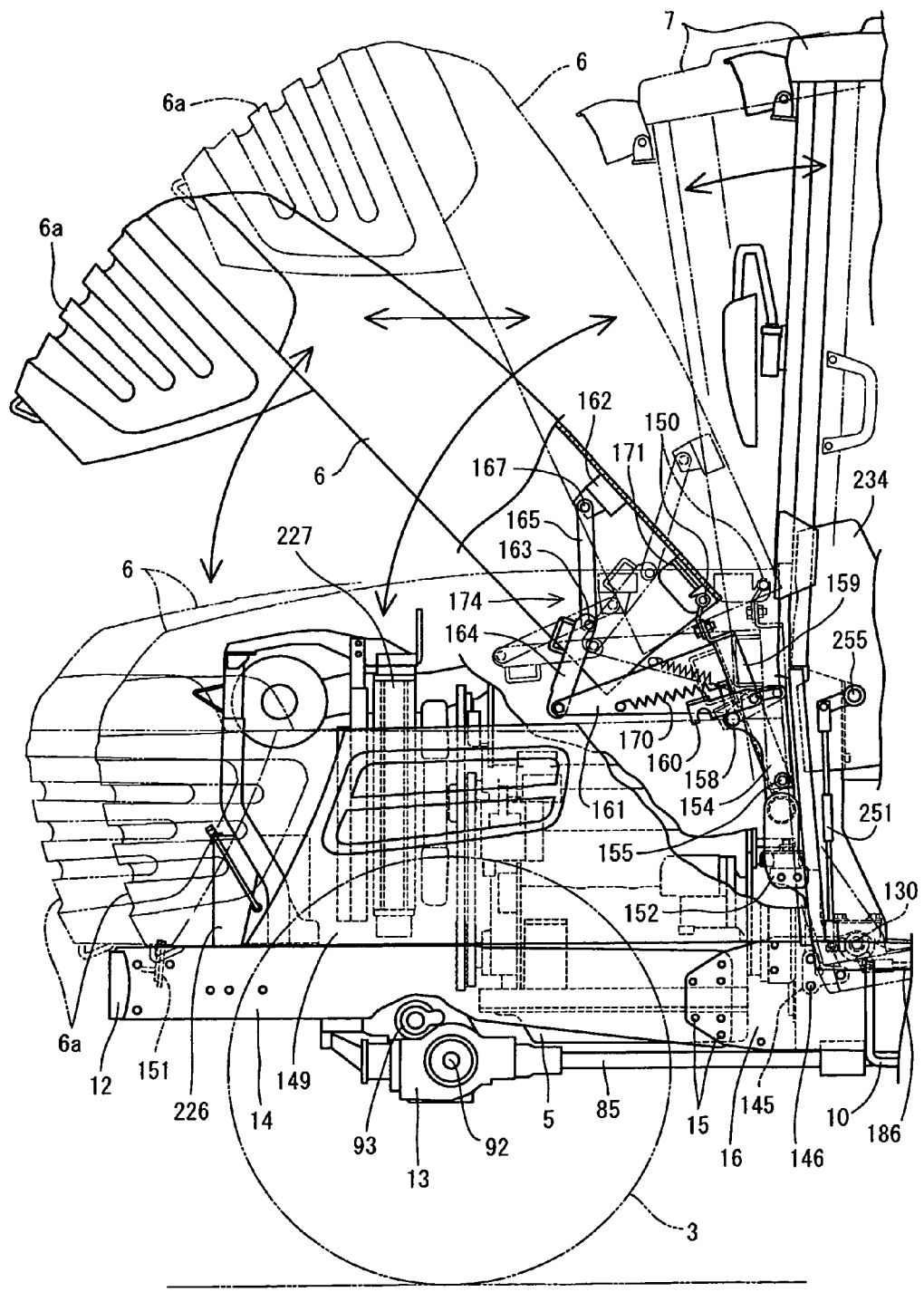
FIG. 16 is an explanatory view showing a state in which the hood is moved forward.

Next, a description will be given in detail of an attaching structure of the engine 5 and the hood 6 with reference to FIGS. 3, 4 and 13 to 18. As shown in FIGS. 3, 4 and 16, both right and left end sides of an engine support frame 145 are fastened to the right and left machine body frames 16 in the forward side of the step floor plate 235 by bolts 146. An upper end side of the engine support frame 145 is coupled to a rear face side of the engine 5 via right and left rear vibration proof rubbers 147. Both right and left side portions of the engine frame 14 are coupled to front portions of the right and left side faces of the engine 5 via right and left front vibration proof rubbers 148. The engine 5 is supported on the traveling machine body 1 by the right and left front vibration proof rubbers 148 and the right and left rear vibration proof rubbers 147.

Figure 13:
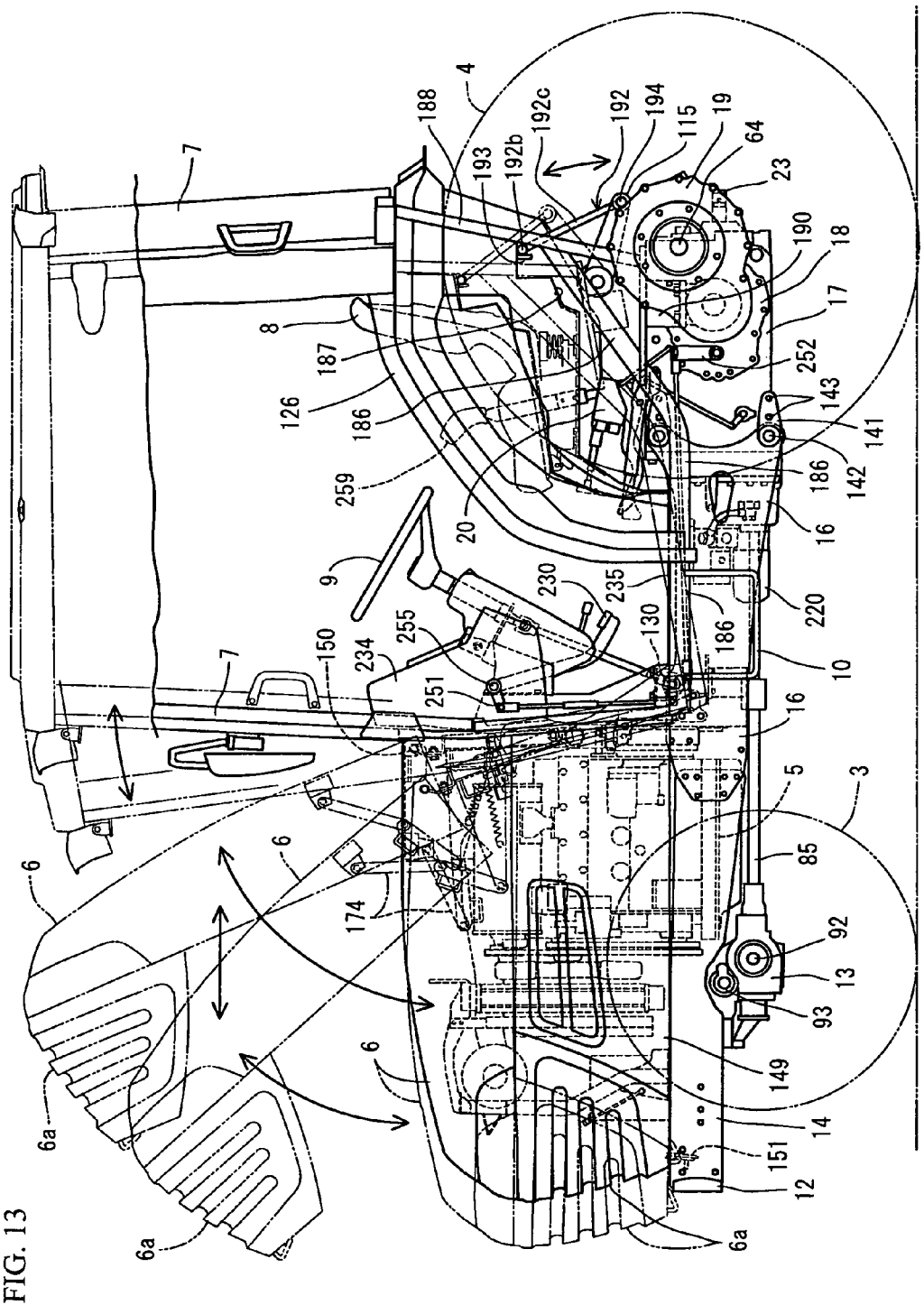
FIG. 13 is a side elevational view showing an attaching structure of a hood and a cabin.
Figure 14:
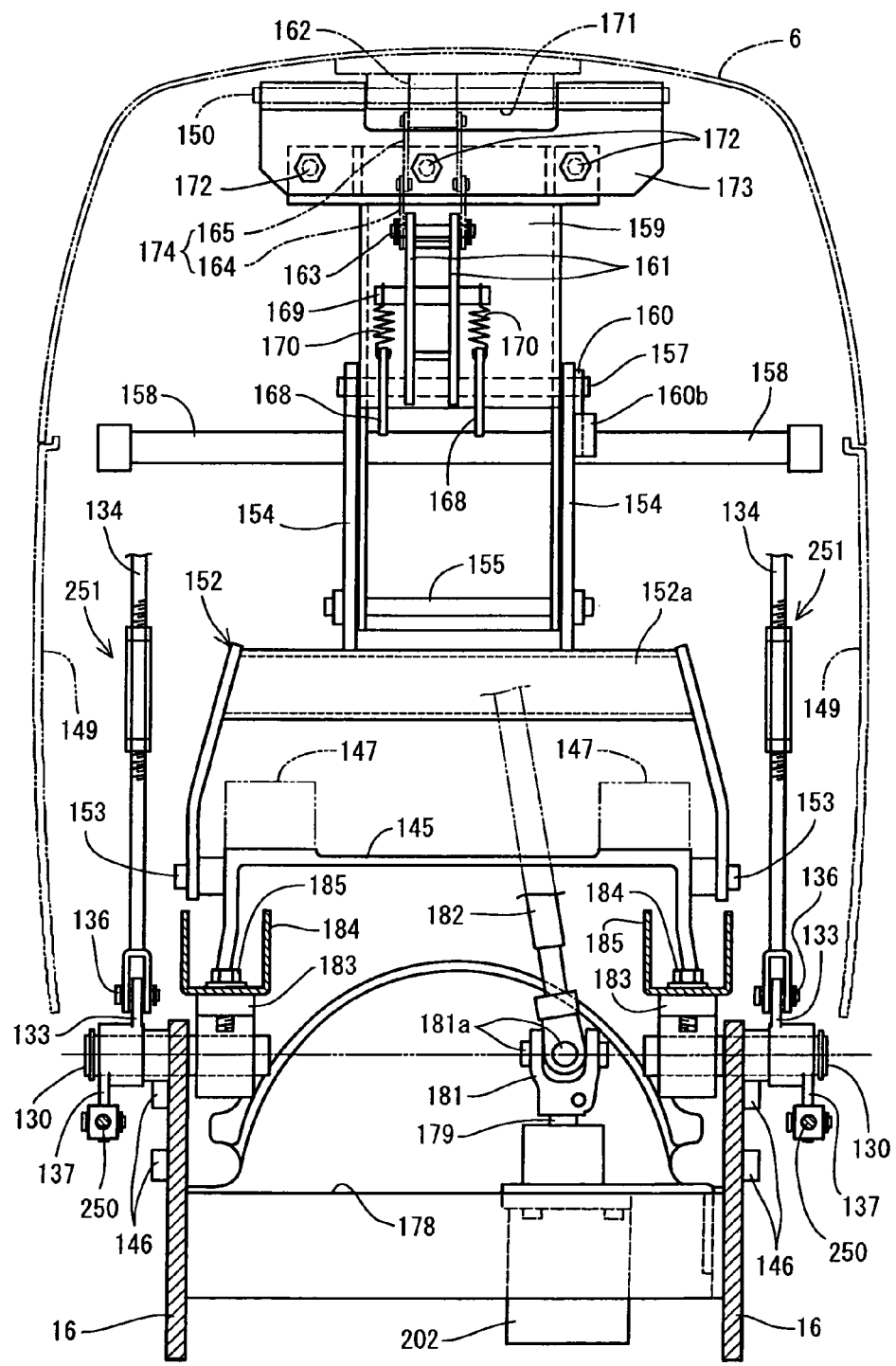
FIG. 14 is a back elevational view showing the attaching structure of the hood and the cabin.
Figure 15:
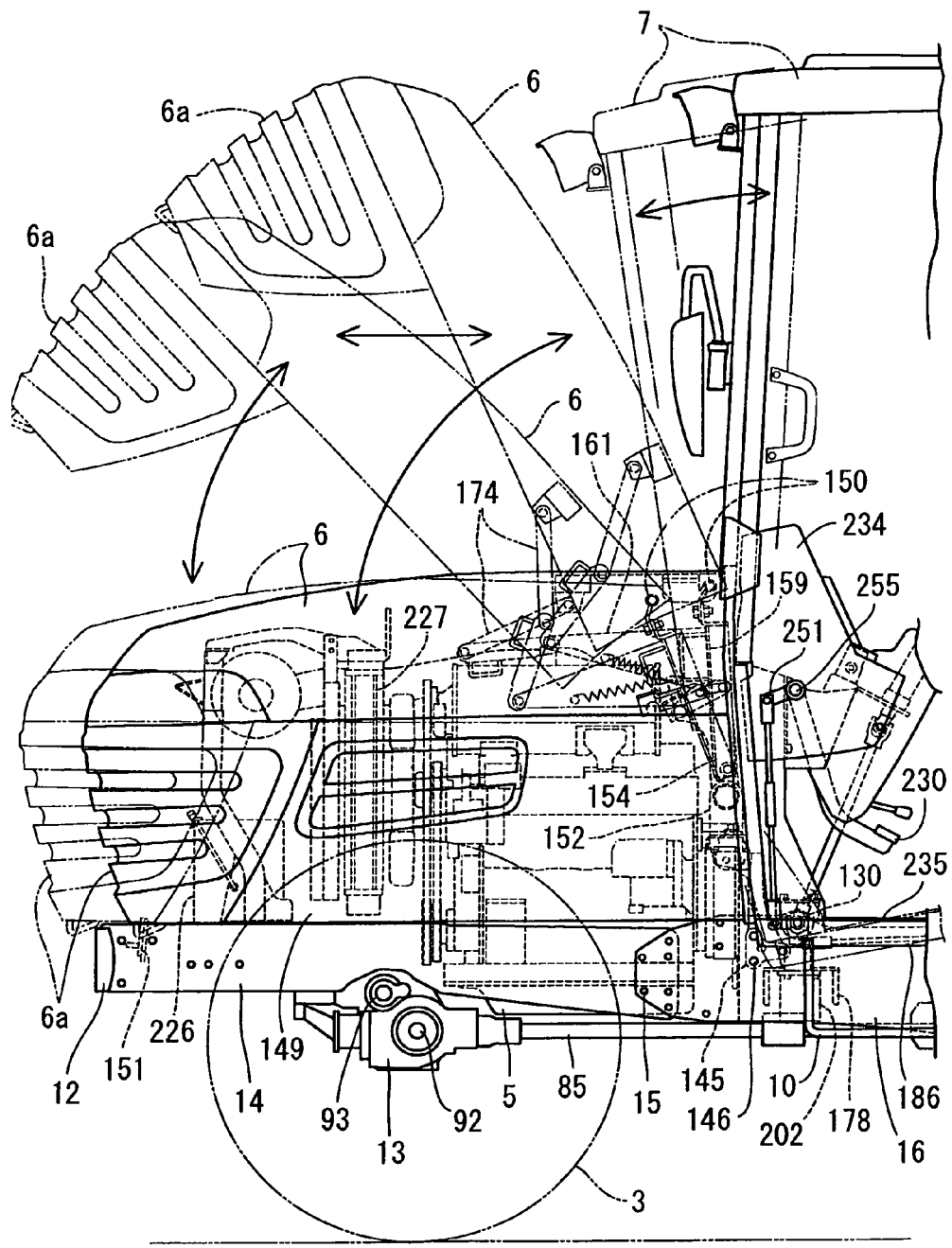
FIG. 15 is a side elevational view showing the attaching structure of the hood.
Figure 17:
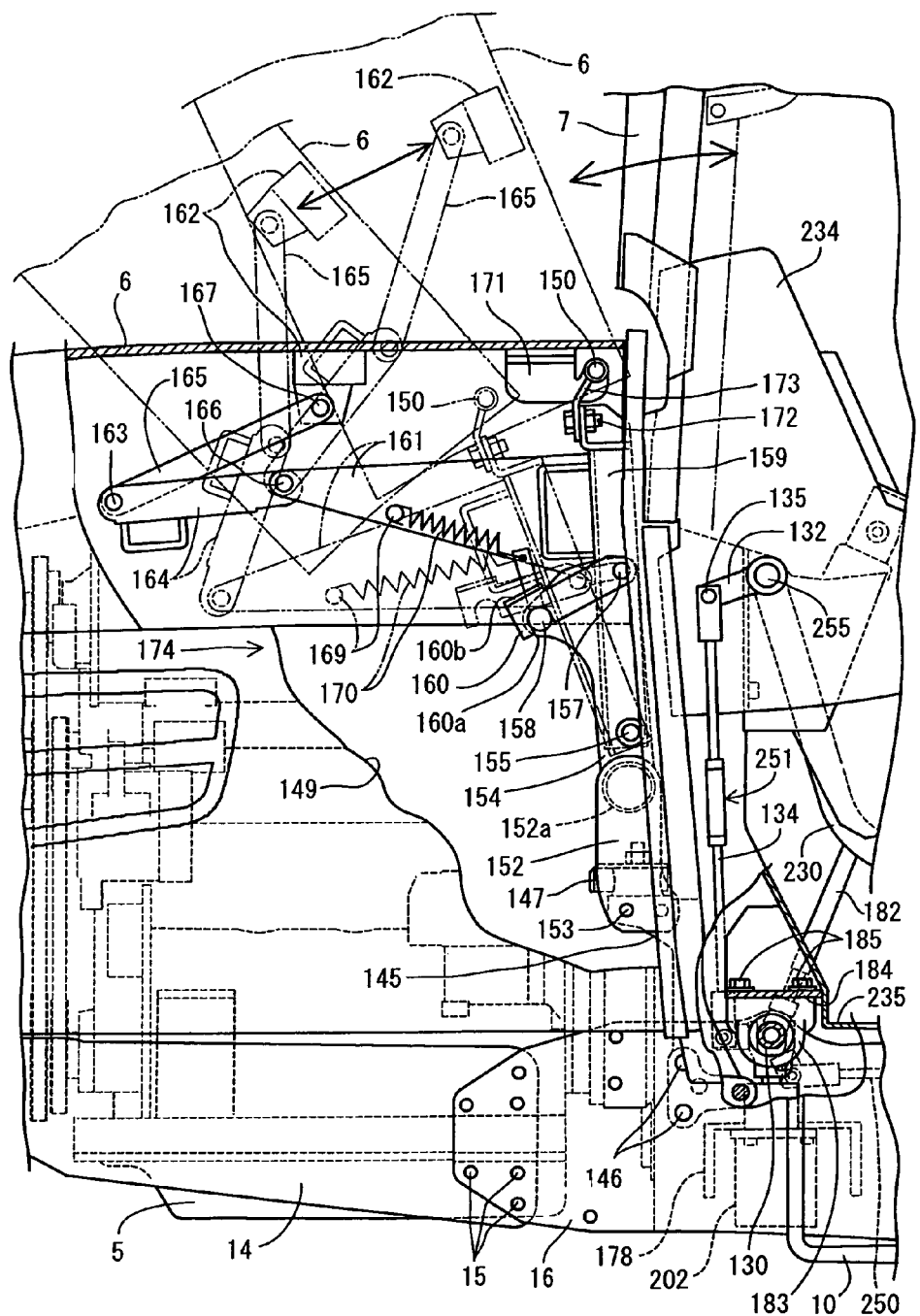
FIG. 17 is an enlarged side elevational view of FIG. 15.
Figure 18:
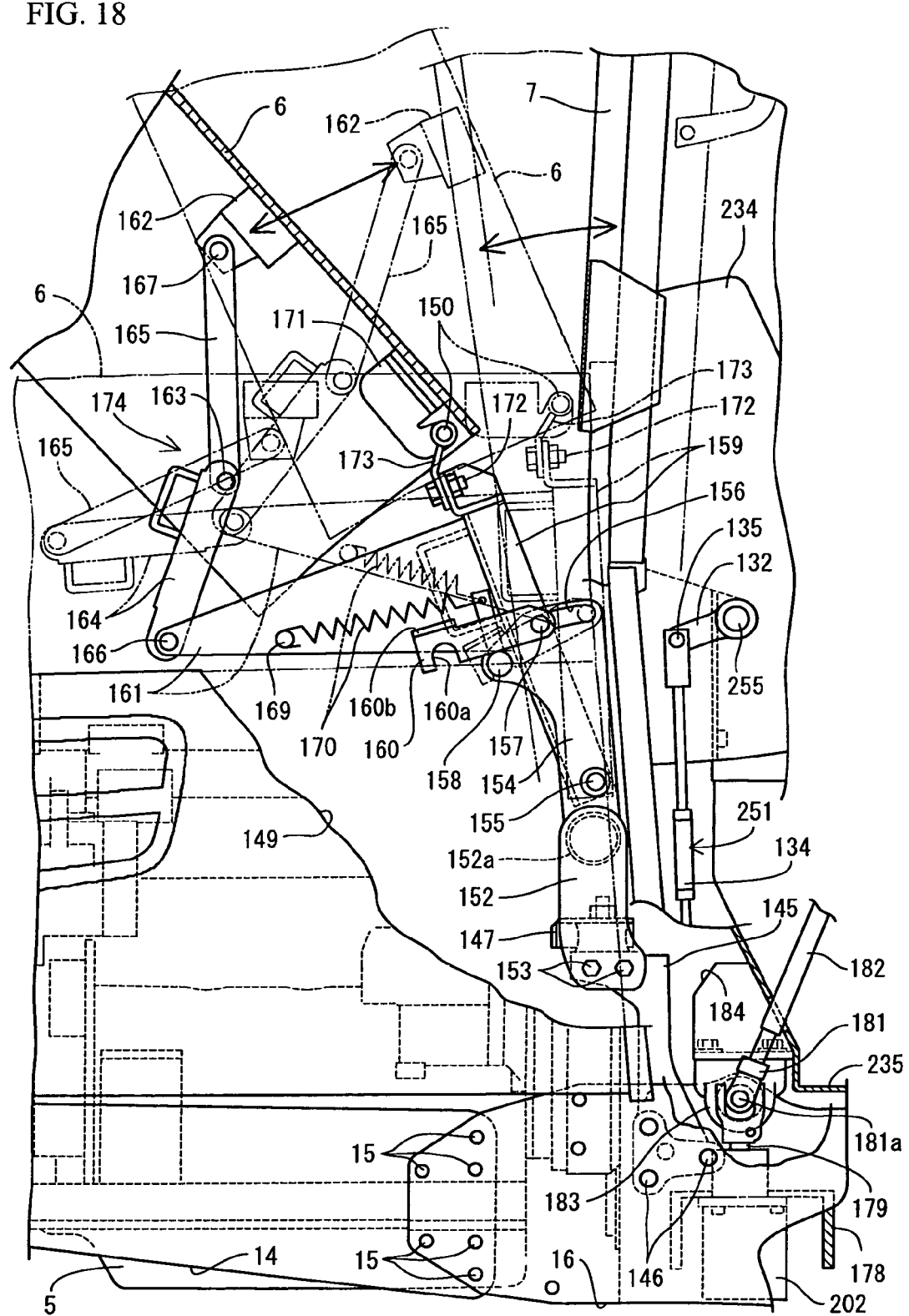
FIG. 18 is an enlarged side elevational view of FIG. 16.

On the other hand, as shown in FIGS. 13 and 14, a front grill 6a is integrally coupled to a lower side of the front portion of the hood 6. The right and left sides, the forward side and the upward side of the engine 5 are covered by right and left engine covers 149 supported on the engine frame 14 and the hood 6. A hood lock mechanism 151 is provided for locking a lower end side of the front grill 6a so as to be freely engaged and disengaged, and the hood lock mechanism 151 is arranged on the engine frame 14 below the front grill 6a. The hood 6 is supported by the hood lock mechanism 151 in such an attitude as to cover the forward side and the upward side of the engine 5. In this case, engine installed parts such as a battery 226, a radiator 227 and the like arranged in the forward side of the engine 5 are covered by the hood 6 and the front grill 6*a* (refer to FIGS. 15 and 16). Further, as shown in FIGS. 17 and 18, a hood opening and closing supporting point shaft 150 is arranged in an inner side of the rear portion of the hood 6. The front portion of the hood 6 is moved upward around the hood opening and closing supporting point shaft 150 in the rear portion of the hood 6 by disconnecting the hood lock mechanism 151 and lifting upward the front portion of the hood 6, thereby widely leafing open the forward side and the upward side of the engine 5.

As shown in FIGS. 14, 17 and 18, lower end sides of both side portions of a gate-shaped hood support frame 152 are fastened to an upper end side of the engine support frame 145 by bolts 153. A pair of right and left opening and closing guide frames 154 are integrally raised from an upper surface of a lateral pipe portion 152*a* of the hood support frame 152. A lower end side of the opening and closing guide frame 154 is firmly attached to an upper surface of the lateral pipe portion 152*a* by welding.

As shown in FIG. 18, a forward and backward movement supporting point shaft 155 passes through a lower end side of the opening and closing guide frame 154. A circular arc shaped guide hole 156 is formed on a circumference around the forward and backward movement supporting point shaft 155, in an upper end side of the opening and closing guide frame 154. A forward and backward movement guide shaft 157 movably passes through a guide hole 156. Further, a forward movement regulating shaft 158 passes through an upper end side of the opening and closing guide frame 154.

As shown in FIGS. 14 and 18, a lower end side of an opening and closing supporting point frame 159 is rotatably fitted onto the forward and backward movement supporting point shaft 155. The forward and backward movement guide shaft 157 passes through the opening and closing supporting point frame 159. The opening and closing supporting point frame 159 and the forward and backward movement guide shaft 157 are structured such as to integrally move around the forward and backward movement supporting point shaft 155. Further, the opening and closing supporting point frame 159 moves forward around the forward and backward movement supporting point shaft 155, whereby a front face of the opening and closing supporting point frame 159 comes into contact with the forward movement regulating shaft 158 so as to prevent the opening and closing supporting point frame 159 from moving forward.

As shown in FIGS. 17 and 18, one end side of a hook lever 160 serving as a lock mechanism for inhibiting the forward movement of the hood 6 is rotatably fitted onto the forward and backward movement guide shaft 157. In the other end side of the hook lever 160, there are formed an engagement notch 160*a* detachably fitted and attached to the forward movement regulating shaft 158, and a detachment operating portion 160*b* canceling the engagement with the forward movement regulating shaft 158. The opening and closing supporting point frame 159 comes to an approximately perpendicular attitude by locking the engagement notch 160*a* to the forward movement regulating shaft 158. Further, the opening and closing supporting point frame 159 comes to a forward titling attitude by lifting up the hook lever 160 while griping the detachment operating portion 160*b* and detaching the engagement notch 160*a* from the forward movement regulating shaft 158. In other words, the opening and closing supporting point frame 159 is supported on the forward and backward movement supporting point shaft 155, in an approximately perpendicular attitude shown in FIG. 17, or a forward tilting attitude shown in FIG. 18.

Further, when the opening and closing supporting point frame 159 is in a forward tilting attitude (FIG. 18), a lower end side of the hook lever 160 movably comes into contact with the forward movement regulating shaft 158 due to its own gravity. In other words, the engagement notch 160*a* is locked to the forward movement regulating shaft 158 by returning the opening and closing supporting point frame 159 from the forward tilting attitude (FIG. 18) to an approximately perpendicular attitude (FIG. 17).

As shown in FIGS. 14, 17 and 18, a hood side hinge 171 firmly attached to the rear end side of the hood 6 is rotatably connected to a frame side hinge 173 fastened to an upper end side of the opening and closing supporting point frame 159 by bolts 172 via the hood opening and closing supporting point shaft 150. In other words, the rear end side of the hood 6 is rotatably connected to the upper end side of the opening and closing supporting point frame 159 via each of the hinges 171 and 173 and the hood opening and closing supporting point shaft 150. Accordingly, whichever position of a position opened around the hood opening and closing supporting point shaft 150 and a position closed therefrom the hood 6 is supported at, it is possible to move the rear end of the hood 6 away from or close to the front face of the cabin 7 in the rearward side of the hood 6, by moving the hood 6 opening and closing (rotating) around the hood opening and closing supporting point shaft 150, around the forward and backward movement supporting point shaft 155 in a state in which the lock of the hood lock mechanism 151 is cancelled.

As shown in FIGS. 14, 17 and 18, there are provided a hood table 161 protruded ahead from a front face of the opening and closing supporting point frame 159, a hood frame 162 firmly attached to an intermediate inner face side of a longitudinal width of the hood 6, and a base portion link 164 and a leading end link 165 for strut which are coupled so as to be collapsible in one direction via a collapsible shaft 163. In other words, a strut mechanism 174 holding the hood 6 at the opened position is formed by the base portion link 164 and the leading end link 165. The base portion link 164 is rotatably coupled to the hood table 161 via a base portion coupling shaft 166. The leading end link 165 is rotatably coupled to the hood frame 162 via a leading end coupling shaft 167. In other words, the base portion link 164 and the leading end link 165 for strut are expanded by lifting upward the front portion of the hood 6, the hood 6 is supported at the opened position on the basis of the strut operation of the base portion link 164 and the leading end link 165, and the upper face side and the forward side of the engine room 54 are left open.

As shown in FIGS. 14, 17 and 18, there are provided a spring bearing arm 168 firmly attached to the forward movement regulating shaft 158, a spring bearing shaft 169 firmly attached to the hood table 161, and a tension spring 170 serving as a return spring in which both end sides are coupled to the spring bearing arm 168 and the spring bearing shaft 169. In other words, the structure is made such that a return operating force returning the forward moved hood 6 rearward is lightened by a force of the tension spring 170 by applying a compression force of the tension spring 170 to the opening and closing supporting point frame 159 in such a direction that the opening and closing supporting point frame 159 is returned to an approximately perpendicular attitude shown in FIG. 17 from a forward tilted attitude shown in FIG. 18. In this case, the forward moved hood 6 is prevented from being returned rearward only by the force of the tension spring 170, by forming the compression force of the tension spring 170 small in comparison with a rearward returning load of the forward moved hood 6.

In accordance with the structure mentioned above, the above side and the forward side of the engine 5 are covered by the hood 6, by locking the lower end side of the front grill 6a to the engine frame 14 via the hood lock mechanism 151 and supporting the hood 6 at a closed position shown by a solid line in FIG. 17. In this case, the engagement notch 160a is locked to the forward movement regulating shaft 158, and the opening and closing supporting point frame 159 is supported in the approximately perpendicular attitude by the hook lever 160. The worker cancels the lock of the hood lock mechanism 151 under this state and lifts up the front portion of the hood 6, whereby it is possible to open the hood 6 around the hood opening and closing supporting point shaft 150 so as to execute the maintenance work or the like of the engine 5. Further it is possible to move forward or backward the hood 6 by rotating the opening and closing supporting point frame 159 around the forward and backward movement supporting point shaft 155, thereby moving the rear end of the hood 6 away from or close to the front face of the cabin 7 in the rearward side of the hood 6.

Figure 19:
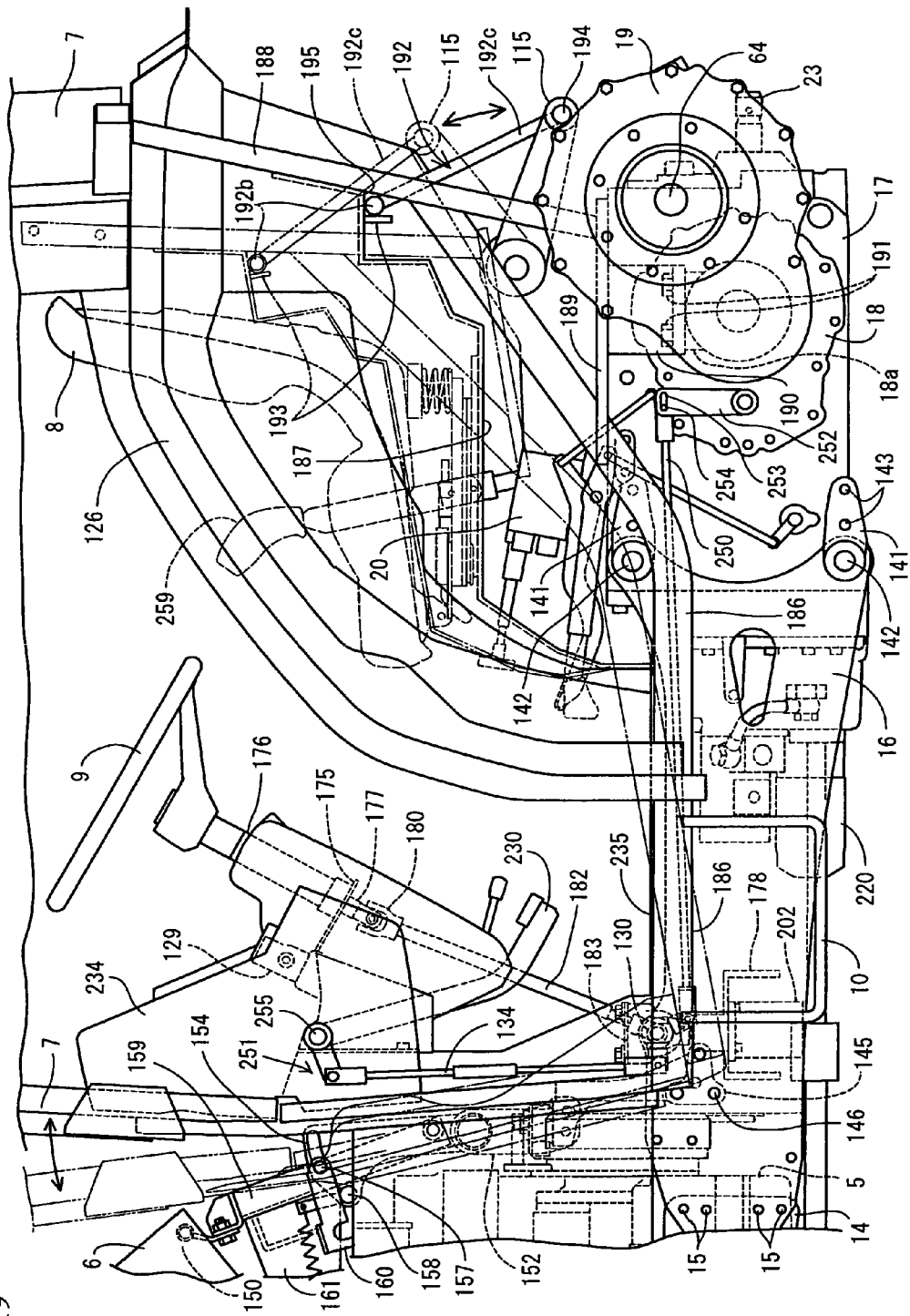
FIG. 19 is a side elevational view showing the attaching structure of the cabin.

Next, a description will be given in detail of an attaching structure of the cabin 7, and a hydraulic steering apparatus such as a power steering hydraulic mechanism 202 or the like, with reference to FIGS. 4, 10, 12, 14 and 17 to 21. As shown in FIG. 19, a handle post 176 is arranged in the control column 234 via a handle frame 175. A handle shaft 177 is passed through the handle post 176. The control handle 9 is assembled in an upper end portion of the handle shaft 177. Further, as shown in FIG. 14, a power steering frame 178 is bridged between the right and left machine body frames 16. The power steering hydraulic mechanism 202 is fastened to the power steering frame 178 by bolts. A power steering input shaft 179 is protruded upward from an upper face of the power steering hydraulic mechanism 202. The power steering input shaft 179 is coupled to a lower end side of the handle shaft 177 via a steering shaft 182 having universal joints 180 and 181.

Accordingly, the operator seated on the driver seat 15 rotationally controls the steering handle 10, whereby the power steering hydraulic mechanism 202 is activated in proportion to an operating amount (a rotating amount), the power steering hydraulic cylinder 93 is driven, and a steering angle (a direction change angle) of the right and left front wheels 5 is changed. Further, a joint shaft body 181a (a bendable coupling portion between the power steering input shaft 179 and the steering shaft 182) of the universal joint 181 is arranged on a shaft center line of the brake operating shaft 130 provided in the right and left machine body frames 16 (refer to FIG. 14). In this case, the power steering hydraulic mechanism 202 has a hydraulic torque generator or the like for the power steering. The structure is made such that the hydraulic torque generator for the power steering is activated in proportion to the operating amount (the rotating amount) of the steering handle 9, and the steering angle (the direction change angle) of the right and left front wheels 5 is changed.

As shown in FIGS. 14 and 17, the right and left brake operating shafts 130 are passed through the right and left machine body frames 16. Outside end portions of the right and left brake operating shafts 130 are protruded from outside faces of the right and left machine body frame 16. The right and left brake operating boss bodies 131 are rotatably fitted onto the outside end portions of the right and left brake operating shafts 130. On the other hand, inside end portions of the right and left brake operating shafts 130 are protruded from inside faces of the right and left machine body frames 16. A cabin support body 183 is rotatably fitted onto the inside end portions of the right and left brake operating shafts 130.

As shown in FIGS. 14 and 17, a cabin rotating bracket 184 is firmly attached to a front end portion of the step floor plate 235 of the cabin 7 by welding. A bottom face of the cabin rotating bracket 184 is brought into contact with an upper face of the cabin support body 183 from the above thereof, and the cabin rotating bracket 184 is fastened to the cabin support body 183 by bolts 185. Accordingly, the cabin 7 is rotated around the brake operating shaft 130.

Figure 20:
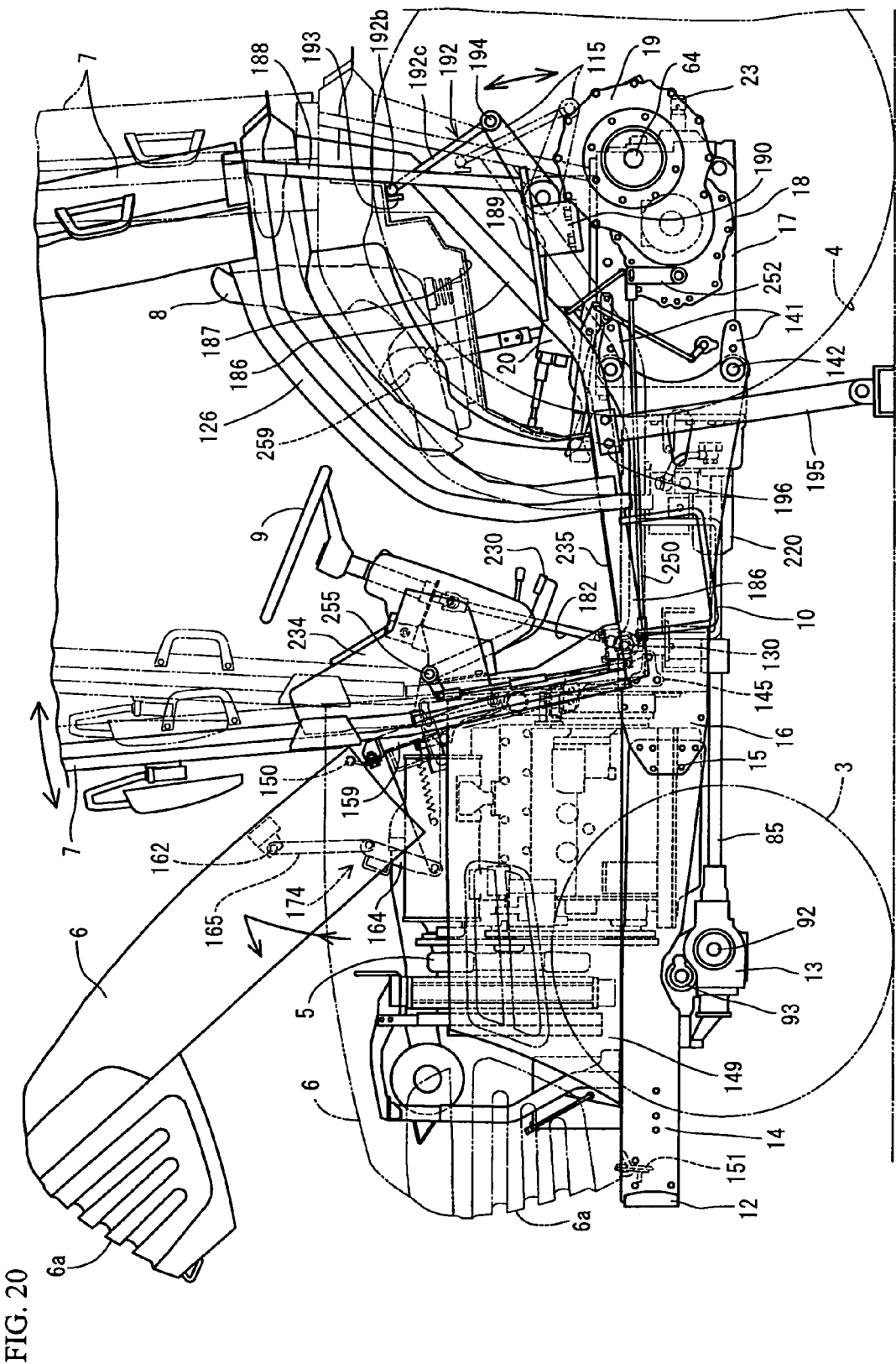
FIG. 20 is an explanatory view showing a state in which a rear portion of the cabin is lifted up.
Figure 21:
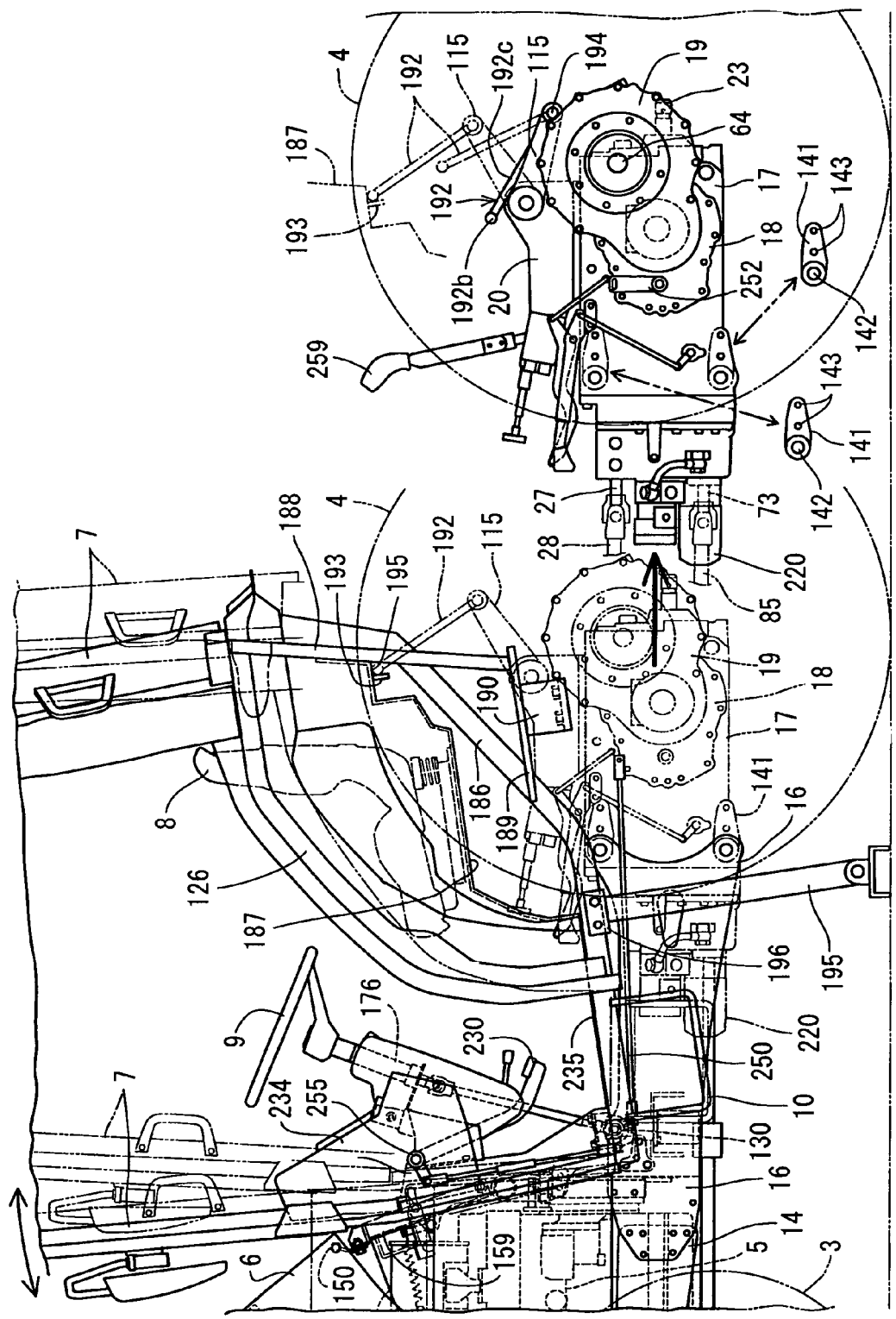
FIG. 21 is an explanatory view showing a state in which the transmission case is detached.

As shown in FIGS. 19 to 21, right and left cabin frames 186 extending in a longitudinal direction is arranged in a bottom portion of the cabin 7. The step floor plate 235 is firmly attached to a first half portion of the right and left cabin frames 186 by welding. A cabin bottom plate 187 mounting the control seat 8 thereon is firmly attached to a second half portion of the right and left cabin frames 186 by welding. The right and left cabin frames 186, the step floor plate 235, and the cabin bottom plate 176 are integrally constructed as a monocoque structure serving as a single part. Right and left rear portion support frames 188 are firmly attached to rear end portions of the right and left cabin frames 186 by welding. The fender 126 is coupled to the cabin frames 186 and upper end sides of the rear portion support frames 188.

Further, rear portion attaching frames 189 are firmly attached to the cabin frames 186 and lower end sides of the rear portion support frames 188 by welding. A rear portion attaching table 190 is firmly attached to a lower surface of the rear portion attaching frame 189 by welding. The rear portion attaching table 190 is brought into contact with the cabin attaching portion 18a in the upper face of the rear axe case 18 from the above, and the rear portion attaching table 190 is fastened to the cabin attaching portion 18a by bolts 191. A front portion and a rear portion of the cabin 7 are coupled to the traveling machine body 1 by the brake operating shaft 130 and the rear axle case 18, and the upper face sides of the transmission case 17, the working machine lifting mechanism 20 and the like are covered by the cabin bottom plate 187.

Next, a description will be given in detail of a rotating structure of the cabin 7 lifting upward the rear portion of the cabin 7, with reference to FIGS. 12 and 19 to 21. As shown in FIGS. 12 and 19, there is provided an upthrow body 192 detachably coupled to the lift arm 115. A projection shaped contact body 193 is arranged on a lower face of the cabin bottom plate 187. The upthrow body 192 has a base end tube 192a fitted onto a coupling shaft 194 detachably passing through a leading end side of the lift arm 115, a round rod shaped leading end rod 192b brought into contact with a rearward downward shaped concave portion 195 formed by a lower face of the cabin bottom plate 187 and the contact body 193 from a rearward below side, and a round rod shaped support arm 192c firmly attached integrally to the base end tube 192a and the leading end rod 192b by welding. In other words, the upthrow body 192 is formed by firmly attaching integrally one end side of the support arm 192c to the base end tube 192a by welding, and firmly attaching integrally the leading end rod 192b to the other end side of the support arm 192c by welding so as to form an approximately T-shaped form.

Next, a description will be given in detail of a rotating structure of the cabin 7 lifting upward the rear portion of the cabin 7 with reference to FIGS. 18 to 21. In the case of lifting upward the rear portion of the cabin 7, first of all, the hood 6 is opened by lifting upward the front portion of the hood 6, and the hook lever 160 is detached from the forward and backward movement regulating shaft 158, as shown in FIG.

18. Further, the opening and closing supporting point frame 159 is rotated around the forward and backward supporting point shaft 155, the hood 6 is moved forward, and the rear end of the hood 6 is moved away from the front face of the cabin 7 in the rearward side of the hood 6. On the other hand, the fastening between the cabin attaching portion 18a and the rear portion attaching table 190 is canceled by detaching the bolts 191. Further, the lift rod 116 shown in FIG. 1 is detached from the lift arm 115 by extracting the coupling shaft 194 from the lift arm 115. Thereafter, the coupling shaft 194 is passed through the lift arm 115 while inserting the coupling shaft 194 to the base end tube 192a, and the upthrow body 192 is coupled to the lift arm 115 via the coupling shaft 194. In this case, the upthrow body 192 is coupled to the cabin bottom plate 187 reinforced by the contact body 193 in accordance with an operation bringing the upthrow body 192 into contact with the cabin bottom plate 187 via the contact body 193. In the case of lifting upward the cabin 7, the upthrow body 192 is supported by the lift arm 115 in such a state that the support arm 192c of the upthrow body 192 is extended in a tangential direction of a rotating locus of the contact body 193 around the cabin support body 183.

Further, the lift arm 115 is rotated only somewhat in an ascending direction by actuating the working machine lifting hydraulic cylinder 205 of the working machine lifting mechanism 20. The contact body 193 is rotationally operated around the coupling shaft 194, and the leading end rod 192b is brought into contact with the contact body 193 as shown in FIG. 19. In this state, the working machine lifting hydraulic cylinder 205 of the working machine lifting mechanism 20 is reactivated, and the lift arm 115 is further rotated in the ascending direction. As a result, as shown in FIG. 20, the cabin 7 is rotated around the brake operating shaft 130 (the cabin support body 183) in such a manner as to move away from the upper face of the working machine lifting mechanism 20, and the rear portion of the cabin 7 is lifted upward. In a state in which the rear portion of the cabin 7 is lifted upward as mentioned above, a maintenance work or a repair work of an upper face side of the transmission case 17, the working machine elevating mechanism 20 and the like is executed in such an attitude that the transmission case 17 and the working machine lifting mechanism 20 are coupled to the machine body frame 16.

Further, since the cabin 7 is rotated around the brake operating shaft 130 and the rear portion of the cabin 7 moves upward, the brake pedal shaft 255 is rotated around the brake operating shaft 130 and is moved forward. In other words, the brake pedal shaft 255 is rotated on the basis of the rotation of the cabin 7, and the brake rod 250 is pushed backward so as to be moved. The pin shaft body 254 moves within the long hole 253 on the basis of the backward movement of the brake rod 250. Accordingly, even if the brake rod 250 is moved backward on the basis of the rotation of the cabin 7, the brake lever 252 is kept approximately at a fixed position, and the rear wheels 4 are not braked by the brake 65. The state in which the braking of the rear wheels 4 is cancelled is maintained. For example, the rear wheels 4 can be rotated by a hand-push operation or the like. In order to prevent the working machine lifting lever 259 or the like from being interfered with the fender 126 in the case that the cabin 7 is rotated, a long hole (not shown) for passing through the working machine lifting lever 259 or the like is formed in the fender 126. Accordingly, it is possible to move upward the rear portion of the cabin 7 without detaching the working machine lifting lever 259 or the like.

On the other hand, as shown in FIGS. 20 and 21, there is provided a cabin support stand 195 supporting the cabin 7 in such an attitude that the rear portion of the cabin 7 is lifted upward, and a stand fixing device 196 arranged in the cabin frame 186 between the cabin support body 183 and the rear axle case 18. Further, in the case of detaching the transmission case 17, the working machine lifting mechanism 20 and the like from the machine body frame 16 and executing the maintenance or the repair thereof, an upper end side of the cabin support stand 195 is locked to the stand fixing device 196 in a state in which the rear portion of the cabin 7 is lifted upward, as shown in FIG. 20, in the same manner as mentioned above. Thereafter, the lift arm 115 is rotated in a descending direction by controlling the working machine lifting hydraulic cylinder 205 of the working machine lifting mechanism 20, and the leading end rod 192b is moved away from the contact body 193. In this state, the pin fastening member is detached by unscrewing the fastening bolt 142 and the fixing bolts 143, and the transmission case 17 is detached from the machine body frame 16. Further, the transmission case 17 supported in the lower face side by a supply car (not shown) or the like is moved backward while rotating the rear wheels 4, and the maintenance work or the repair work of the transmission case 17, the working machine lifting mechanism 20 or the like is executed.

In the case that the transmission case 17 is moved backward as mentioned above, the main shift input shaft 27 is detached from the power transmission shaft 28 in their universal joint portion. Further, the front wheel output shaft 73 is detached from the front wheel drive shaft 85 in their universal joint portion. On the other hand, in the case of assembling the transmission case 17, the working machine lifting mechanism 20 and the like, a work operation is carried out in accordance with an inverse procedure to the procedure mentioned above, the transmission case 17 is moved forward so as to be coupled to the machine body frame 16, the cabin support stand 195 is detached by controlling the working machine lifting hydraulic cylinder 205 of the working machine lifting mechanism 20, and the rear portion of the cabin 7 is moved downward so as to be coupled to the rear axle case 18, whereby the assembly of the transmission case 17, the cabin 7 and the like is finished.

As is apparent from the description mentioned above and FIGS. 17 and 19 to 21, in the working vehicle with cabin provided with the traveling machine body 2 mounting the engine 5 thereon, the cabin 7 having the control seat 8 for the operator and the control handle 9, the lower link 21 serving as the link mechanism coupling the working portion to the traveling machine body 2, the working machine lifting mechanism 20 serving as the hydraulic lifting mechanism moving aboveground the working portion coupled to the lower link 21, and the lift rod 116 detachably coupling the lift arm 115 of the working machine lifting mechanism 20 and the lower link 21, and constructed such that the upper face side of the working machine lifting mechanism 20 is left open by arranging the cabin support body 183 in the lower end portion in the front portion of the cabin 7, arranging the working machine lifting mechanism 20 below the rear portion of the cabin 7, and rotating the cabin 7 around the cabin support body 183, since the upthrow body 192 brought into contact with the cabin 7 from the below is provided, and the upthrow body 192 is detachably coupled to the lift arm 115 from which the lift rod is detached, it is possible to couple the upthrow body 192 to the cabin 7 on the basis of a simple operation bringing the upthrow body 192 coupled to the lift arm 115 into contact with the bottom portion of the cabin 7 mounted to the traveling machine body 2. In other words, since the structure of the upthrow body 192 is not restricted by the structure of the lower link 21 or the like, it is possible to simply construct the structure of the cabin 7 or the structure of the upthrow body 192. Accordingly, it is possible to simply couple the lift arm 115 to the cabin 7 via the upthrow body 192 in the case of lifting upward the cabin 7.

As is apparent from the description mentioned above and FIGS. 10, 14, 17 and 18, in the working vehicle with cabin provided with the traveling machine body 2 having the front wheels 3 and the rear wheels 4 serving as the traveling portion, the engine 5 mounted on the traveling machine body 2, the cabin 7 having the control seat 8 for the operator, the control handle 9, the brake pedal 230 and the like, the link mechanism (the lower link 21 and the top link 22) for coupling the working machine and the working machine lifting mechanism 20 serving as the hydraulic lifting mechanism, and constructed such that the upper face side of the working machine lifting mechanism 20 is left open by arranging the cabin support body 183 in the lower end portion in the front portion of the cabin 7, arranging the working machine lifting mechanism 20 below the rear portion of the cabin 7, and rotating the cabin 7 around the cabin support body 183, since the brake link mechanism 251 and the cabin support body 183 are arranged on the brake operating shaft 130 provided in the traveling machine body 2, the brake link mechanism 251 serving as the brake operating mechanism coupling the brake pedal 230 to the brake 65 serving as the brake body of the rear wheels 4, the cabin 7 and the brake pedal 230 are rotated around the brake operating shaft 130 (the same shaft center line). Accordingly, it is possible to rotate the cabin 7 around the cabin support body 183 corresponding to the supporting point without disassembling the brake link mechanism 251 or the like. It is possible to couple the brake pedal 230 to the brakes 65 of the rear wheels 4 via the brake link mechanism 251 having the simple structure. Further, it is possible to simply construct the windbreak and waterproof structures of the cabin 7 by arranging the brake pedal 230 within the cabin 7.

As is apparent from the description mentioned above and FIG. 14, since the power steering hydraulic mechanism 202 is arranged in the traveling machine body 2, the universal joint 181 is provided coupling the handle shaft 177 of the control handle 9 and the power steering input shaft 179 serving as the operating shaft of the power steering hydraulic mechanism 202, and the universal joint 181 is arranged on the shaft center line of the brake operating shaft 130, the cabin 7 and the control handle 9 are rotated around the brake operating shaft 130 (the same shaft center line). It is possible to rotate the cabin 7 around the cabin support body 183 corresponding to the supporting point without disassembling the coupling mechanism (the handle shaft 177 and the universal joint 181) between the control handle 9 and the power steering hydraulic mechanism 202. It is possible to couple the control handle 9 to the power steering hydraulic mechanism 202 via the simple coupling mechanism (the handle shaft 177 and the universal joint 181).

As is apparent from the description mentioned above and FIGS. 19, 20 and 21, since the upthrow body 192 brought into contact with the cabin 7 from the below is provided, and the upthrow body 192 is detachably coupled to the lift arm 115 of the working machine lifting mechanism 20, it is possible to rotate the cabin 7 around the cabin support body 183 serving as the supporting point by utilizing the hydraulic force of the working machine lifting mechanism 20. Accordingly, it is possible to simply execute the disassembling work or the maintenance work of the transmission case 17, the working machine lifting mechanism 20 and the like in the rear portion of the traveling machine body 2, by supporting the cabin 7 by utilizing the support means such as the cabin support stand 195 or the like in the state in which the rear portion of the cabin 7 is rotated upward.

As is apparent from the description mentioned above and FIGS. 19 to 21, since the contact body 193 is protruded from the lower face of the cabin bottom plate 187 arranged in the bottom portion of the cabin 7 toward the downward side, and the leading end side of the upthrow body 192 coupled to the lift arm 115 under the downward moving attitude comes into contact with the contact body 193 so as to freely come close thereto and away therefrom, it is possible to simply couple the upthrow body 192 to the cabin bottom plate 187 reinforced by the contact body 193 in accordance with the operation bringing the upthrow body 192 into contact with the cabin bottom plate 187 via the contact body 193. Further, since the upthrow body 192 can be extended in the tangential direction of the rotating locus of the contact body 193 around the cabin support body 183 in the case of lifting upward the cabin 7, it is possible to support the cabin 7 by the upthrow body 192 having the simple structure.

As is apparent from the description mentioned above and FIGS. 19 to 21, since the cabin support stand 195 raised on the ground is provided, the cabin frame 186 of the cabin 7 is extended from the cabin support body 183 toward the above side of the rear axle case 18 of the traveling machine body 2, the stand fixing device 196 is arranged in the cabin frame 186 between the cabin support body 183 and the rear axle case 18, and the cabin support stand 195 is detachably coupled to the cabin frame 186 in the forward side of the rear axle case 18 via the stand fixing device 196, it is possible to widely leave open the upper face side of the rear portion of the traveling machine body 2 by raising the cabin support stand 195 on the ground, and supporting the cabin 7 lifted above the traveling machine body 2 by the cabin support stand 195. Accordingly, it is possible to simply take out the rear half portion of the traveling machine body 2 such as the working machine lifting mechanism 20, the transmission case 17 or the like to the rear side of the traveling machine body 2. In other words, it is possible to simply execute the maintenance work, the disassembling and assembling work or the like of the rear half portion of the traveling machine body 2 without detaching the cabin 7 from the traveling machine body 2

As is apparent from the description mentioned above and FIGS. 14 to 18, in the working vehicle with cabin provided with the traveling machine body 2 mounting the engine 5 thereon, the hood 6 covering the engine 5, and the cabin 7 having the control seat 8 for the operator, the control handle 9 and the like, constructed such that the rear portion of the hood 6 is coupled to the traveling machine body 2 via the opening and closing supporting point shaft 150, and the hood 6 is rotated around the opening and closing supporting point shaft 150, whereby the front portion of the hood 6 is movable upward, and also constructed such that the cabin support body 183 is arranged in the lower end side of the front portion of the cabin 7, and the cabin 7 is rotated around the cabin support body 183, whereby the rear portion of the cabin 7 is movable upward, since the opening and closing supporting point shaft 150 is arranged in the traveling machine body 2 so as to be movable in the longitudinal direction, and the rear end of the hood 6 is movable forward and away from the front face of the cabin 7 by moving the opening and closing supporting point shaft 150 forward, it is possible to widely leave open the front side and the upper face side of the engine 5 by rotating the hood 6 around the opening and closing supporting point shaft 150 in the rear portion of the hood 6. Further, by moving the hood 6 forward, it is possible to prevent the cabin 7 from being interfered with the hood 6 even when the cabin 7 is rotated forward, whereby it is possible to simply lift upward the rear portion of the cabin 7. In other words, it is possible to widely leave open the front portion of the upper face side of the engine 5 by rotating the hood 6 around the opening and closing supporting point shaft 150 in the rear portion of the hood 6, whereby it is possible to simply secure the maintenance work space of the engine 5. Further, it is possible to widely leave open the upper face side of the hydraulic lifting mechanism 20, the transmission case 17 and the like arranged below the rear portion of the cabin 7, by rotating forward the cabin 7 around the cabin support body 183, whereby it is possible to simply secure the maintenance work space of the hydraulic lifting mechanism 20, the transmission case 17 and the like. Accordingly, it is possible to simply improve the maintenance workability of the engine 5, the hydraulic lifting mechanism 20 or the like.

As is apparent from the description mentioned above and FIGS. 14 to 18, since the working vehicle is provided with the engine support frame 145 supporting the rear portion of the engine 5 on the traveling machine body 2, the opening and closing supporting point frame 159 serving as the hood support body coupling to the engine support frame 145 so as to be rotatable in the longitudinal direction, and the hook lever 160 serving as the lock mechanism supporting the opening and closing supporting point frame 159 at the initial position, and the opening and closing supporting point frame 159 is supported at the initial position via the hook lever 160 on the basis of the operation returning the hood 6 to the initial position, it is possible to support the opening and closing supporting point shaft 150 which is movable in the longitudinal direction, with a high rigidity via the opening and closing supporting point frame 159 having the simple structure, by utilizing the engine support frame 145. Further, in the case of moving the hood 6 to the closed position for covering the engine 5, the opening and closing supporting point frame 159 is locked at the initial position by the hook lever 160 without any special operation of the hook lever 160 by the operator. In other words, in the case that the opening and closing supporting point frame 159 is returned to the initial position in accordance with the operation returning the forward moved hood 6 rearward, the opening and closing supporting point frame 159 is locked to the initial position by the hook lever 160 in conjunction with the return. Accordingly, it is possible to prevent the hood 6 from being closed in a state in which the operator neglects the lock operation of the opening and closing supporting point frame 159. Therefore, it is possible to improve an opening and closing operability of the hood 6.

As is apparent from the description mentioned above and FIGS. 14 to 18, since the front grill 6a covering the forward side of the engine 5 is arranged in the front portion of the hood 6, and the tension spring 170 serving as the return spring elastically pressing the opening and closing supporting point frame 159 in the direction of returning to the initial position is provided, it is possible to widely leave open the forward side of the engine 5 by integrally lifting up the front portion of the hood 6 and the front grill 6a, and it is possible to simply improve the maintenance workability of the engine attached part such as the battery 226, the radiator 227 or the like arranged in the front side of the engine 5. Further, since the force of the return spring 170 is applied in the direction moving rearward the hood 6, even if the operator grips the front grill 6a in the front side of the traveling machine body 2 and pushes the hood 6 rearward in the case of finishing the maintenance work, the push operating force of the worker is lightened by the force of the return spring 170. In other words, it is possible to lower the deforming force of the front grill 6 generated by the pushing operation of the worker. The worker can simply close the hood 6 while gripping the front grill 6a.

The invention claimed is:
1. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body; and
an upthrow body brought into contact with the cabin from the below is provided, and the upthrow body is detachably coupled to the lift arm, wherein the upthrow body is detachably coupled to the lift arm from which the lift rod is detached.

2. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body;
wherein a brake operating mechanism coupling a brake pedal to a brake body of the traveling machine body, and the cabin support body are arranged on a brake operating shaft provided in the traveling machine body; and
an upthrow body brought into contact with the cabin from the below is provided, and the upthrow body is detachably coupled to the lift arm.

3. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body;
an upthrow body brought into contact with the cabin from the below is provided, and the upthrow body is detachably coupled to the lift arm; and wherein a contact body is protruded from a lower face of a cabin bottom plate arranged in a bottom portion of the cabin toward a downward side, and a leading end side of the upthrow body coupled to the lift arm under a downward moving attitude comes into contact with the contact body so as to freely come close thereto and away therefrom.

4. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body;
an upthrow body brought into contact with the cabin from the below is provided, and the upthrow body is detachably coupled to the lift arm; and
wherein a cabin frame of the cabin is extended from the cabin support body toward an upward side of a rear axle case of the traveling machine body, a stand fixing device is arranged in the cabin frame between the cabin support body and the rear axle case, and a cabin support stand is detachably coupled to the cabin frame in a forward side of the rear axle case via the stand fixing device.

5. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body;
an upthrow body brought into contact with the cabin from the below is provided, and the upthrow body is detachably coupled to the lift arm; and
wherein the working vehicle is constructed such that a hood covering the engine is provided, a rear portion of the hood is coupled to the traveling machine body via an opening and closing supporting point shaft, and the hood is rotated around the opening and closing supporting point shaft, whereby a front portion of the hood is movable upward, and the working vehicle is also constructed such that the cabin support body is arranged in a lower end side of a front portion of the cabin, and the cabin is rotated around the cabin support body, whereby a rear portion of the cabin is movable upward, wherein the opening and closing supporting point shaft is arranged in the traveling machine body so as to be movable in a longitudinal direction, and a rear end of the hood is movable forward and away from a front face of the cabin by moving the opening and closing supporting point shaft forward.

6. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body;
an upthrow body brought into contact with the cabin from the below is provided, and the upthrow body is detachably coupled to the lift arm;
wherein the working vehicle is constructed such that a hood covering the engine is provided, a rear portion of the hood is coupled to the traveling machine body via an opening and closing supporting point shaft, and the hood is rotated around the opening and closing supporting point shaft, whereby a front portion of the hood is movable upward, and the working vehicle is also constructed such that a cabin support body is arranged in a lower end side of a front portion of the cabin, and the cabin is rotated around the cabin support body, whereby a rear portion of the cabin is movable upward, wherein the opening and closing supporting point shaft is arranged in the traveling machine body so as to be movable in a longitudinal direction, and a rear end of the hood is movable forward and away from a front face of the cabin by moving the opening and closing supporting point shaft forward; and
wherein the working vehicle is provided with an engine support frame supporting a rear portion of the engine on the traveling machine body, a hood support body coupling to the engine support frame so as to be rotatable in a longitudinal direction, and a lock mechanism supporting the hood support body at an initial position, and the hood support body is supported at the initial position via the lock mechanism on the basis of an operation returning the hood to the initial position.

7. A working vehicle with cabin comprising:
a traveling machine body mounting an engine thereon;
a cabin having a control seat for an operator and a control handle;
a link mechanism coupling a working portion to the traveling machine body;
a hydraulic lifting mechanism moving aboveground the working portion coupled to the link mechanism;
a lift rod detachably coupling a lift arm of the hydraulic lifting mechanism and the link mechanism;
wherein an upper face side of the hydraulic lifting mechanism is left open by arranging a cabin support body in a lower end portion in a front portion of the cabin, arranging the hydraulic lifting mechanism below a rear portion of the cabin, and rotating the cabin around the cabin support body;
an upthrow body brought into contact with the cabin from the below is provided, and the upthrow body is detachably coupled to the lift arm;

wherein the working vehicle is constructed such that a hood covering the engine is provided, a rear portion of the hood is coupled to the traveling machine body via an opening and closing supporting point shaft, and the hood is rotated around the opening and closing supporting point shaft, whereby a front portion of the hood is movable upward, and the working vehicle is also constructed such that a cabin support body is arranged in a lower end side of a front portion of the cabin, and the cabin is rotated around the cabin support body, whereby a rear portion of the cabin is movable upward, wherein the opening and closing supporting point shaft is arranged in the traveling machine body so as to be movable in a longitudinal direction, and a rear end of the hood is movable forward and away from a front face of the cabin by moving the opening and closing supporting point shaft forward; and wherein a front grill covering a forward side of the engine is arranged in a front portion of the hood, and a return spring elastically pressing the hood support body in a direction of returning to the initial position is provided.

8. The working vehicle with cabin according to claim 1, wherein a brake operating mechanism coupling a brake pedal to a brake body of the traveling portion, and the cabin support body are arranged on a brake operating shaft provided in the traveling machine body.

9. The working vehicle with cabin according to claims 8 or 2, wherein a steering hydraulic mechanism is arranged in the traveling machine body, a universal joint coupling a handle shaft of the control handle is provided to an operating shaft of the steering hydraulic mechanism, and the universal joint is arranged on a shaft center line of the brake operating shaft.

10. The working vehicle with cabin according to any one of claim 1, 3 or 4 wherein the working vehicle is constructed such that a hood covering the engine is provided, a rear portion of the hood is coupled to the traveling machine body via an opening and closing supporting point shaft, and the hood is rotated around the opening and closing supporting point shaft, whereby a front portion of the hood is movable upward, and the working vehicle is also constructed such that a cabin support body is arranged in a lower end side of a front portion of the cabin, and the cabin is rotated around the cabin support body, whereby a rear portion of the cabin is movable upward, wherein the opening and closing supporting point shaft is arranged in the traveling machine body so as to be movable in a longitudinal direction, and a rear end of the hood is movable forward and away from a front face of the cabin by moving the opening and closing supporting point shaft forward.

11. The working vehicle with cabin according to claims 6 or 7, wherein the upthrow body is detachably coupled to the lift arm from which the lift rod is detached.

12. The working vehicle with cabin according to claims 6 or 7, wherein a contact body is protruded from a lower face of a cabin bottom plate arranged in a bottom portion of the cabin toward a downward side, and a leading end side of the upthrow body coupled to the lift arm under a downward moving attitude comes into contact with the contact body so as to freely come close thereto and away therefrom.

13. The working vehicle with cabin according to claim 6 or 7, wherein a cabin frame of the cabin is extended from the cabin support body toward an upward side of a rear axle case of the traveling machine body, a stand fixing device is arranged in the cabin frame between the cabin support body and the rear axle case, and a cabin support stand is detachably coupled to the cabin frame in a forward side of the rear axle case via the stand fixing device.

* * * * *